(12) United States Patent
Martin et al.

(10) Patent No.: US 12,441,028 B2
(45) Date of Patent: Oct. 14, 2025

(54) SYSTEMS AND METHODS FOR MIXING MATERIALS FOR ADDITIVE MANUFACTURING

(71) Applicant: 3DFortify Inc., Boston, MA (US)

(72) Inventors: Joshua J. Martin, Arlington, MA (US); Scott Goodrich, Malden, MA (US); Andrew J. Caunter, Somerville, MA (US); Manny Barros, Westwood, MA (US); Benjamin M. MacDonald, South Hamilton, MA (US)

(73) Assignee: 3DFortify Inc., Boston, MA (US)

( * ) Notice: Subject to any disclaimer, the term of this patent is extended or adjusted under 35 U.S.C. 154(b) by 859 days.

(21) Appl. No.: 17/274,406

(22) PCT Filed: Sep. 10, 2019

(86) PCT No.: PCT/US2019/050414
§ 371 (c)(1),
(2) Date: Mar. 8, 2021

(87) PCT Pub. No.: WO2020/055870
PCT Pub. Date: Mar. 19, 2020

(65) Prior Publication Data
US 2022/0024075 A1    Jan. 27, 2022

Related U.S. Application Data

(60) Provisional application No. 62/729,120, filed on Sep. 10, 2018.

(51) Int. Cl.
*B33Y 10/00* (2015.01)
*B01F 23/50* (2022.01)
(Continued)

(52) U.S. Cl.
CPC .............. *B29B 7/385* (2013.01); *B01F 23/57* (2022.01); *B01F 23/59* (2022.01); *B01F 27/272* (2022.01);
(Continued)

(58) Field of Classification Search
CPC ......... B29B 7/385; B29B 7/603; B29B 7/728; B33Y 10/00; B33Y 30/00; B33Y 40/00;
(Continued)

(56) References Cited

U.S. PATENT DOCUMENTS 5,279,463 A    1/1994   Holl
5,525,051 A *  6/1996   Takano ................. B29C 64/135
                                                      264/401
(Continued)

FOREIGN PATENT DOCUMENTS

DE    102009056688 A1 *  7/2011  ............. B08B 1/007
GB    2 192 558 A         1/1988
WO    2017/194144 A1     11/2017

OTHER PUBLICATIONS

Hochsmann et al., DE 102009056688, published Jul. 14, 2011, machine translation to English (Year: 2011).*
(Continued)

*Primary Examiner* — Yung-Sheng M Tsui
(74) *Attorney, Agent, or Firm* — Barnes & Thornburg, LLP

(57) ABSTRACT

Additive manufacturing apparatus and methods for mixing and dispensing materials, and articles with controlled particle concentrations. Additive manufacturing apparatus includes a mixer; a reservoir in fluidic communication with the mixer; and a build plate parallel to the reservoir. Additive manufacturing apparatus includes a mixer and a solid particle dispensing system and/or a slurry dispensing system. A method for handling precursors during additive manufactur-
(Continued)

ing includes (a) providing first and second precursor materials and/or a slurry to a mixer; (b) mixing the materials in the mixer; (c) transporting the mixed materials directly to a reservoir disposed in parallel with a build plate; (d) curing at least a portion of the transported and mixed materials; and (e) repeating step (d) at least once. An article includes a plurality of adjacent layers, a concentration of particles in each layer defining a controlled concentration gradient and/or vary by no more than ±50%.

19 Claims, 18 Drawing Sheets

(51) Int. Cl.
| | |
|---|---|
| B01F 23/57 | (2022.01) |
| B01F 27/272 | (2022.01) |
| B01F 35/21 | (2022.01) |
| B29B 7/38 | (2006.01) |
| B29B 7/60 | (2006.01) |
| B29B 7/72 | (2006.01) |
| B29C 64/106 | (2017.01) |
| B29C 64/314 | (2017.01) |
| B29C 64/336 | (2017.01) |
| B29C 64/343 | (2017.01) |
| B29C 64/393 | (2017.01) |
| B33Y 30/00 | (2015.01) |
| B33Y 40/10 | (2020.01) |
| B33Y 50/02 | (2015.01) |
| B01F 101/00 | (2022.01) |

(52) U.S. Cl.
CPC .......... *B01F 35/2112* (2022.01); *B29B 7/603* (2013.01); *B29B 7/728* (2013.01); *B29C 64/106* (2017.08); *B29C 64/314* (2017.08); *B29C 64/336* (2017.08); *B29C 64/343* (2017.08); *B29C 64/393* (2017.08); *B33Y 10/00* (2014.12); *B33Y 30/00* (2014.12); *B33Y 40/10* (2020.01); *B33Y 50/02* (2014.12); *B01F 27/2723* (2022.01); *B01F 2101/2805* (2022.01)

(58) Field of Classification Search
CPC ....... B33Y 40/10; B33Y 50/02; B29C 64/314; B29C 64/343; B29C 64/393; B29C 64/106; B29C 64/336; B29C 64/255; B29C 64/259; B29C 64/307; B29C 64/321; B29C 64/357; B29C 64/124; B01F 23/57; B01F 23/59; B01F 35/2112; B01F 27/272; B01F 27/2723; B01F 2101/2805
USPC .................................................. 425/200, 375
See application file for complete search history.

(56) References Cited

U.S. PATENT DOCUMENTS

| | | | |
|---|---|---|---|
| 2017/0050389 A1* | 2/2017 | Lee ........................ | B33Y 40/00 |
| 2018/0029291 A1 | 2/2018 | Matzner et al. | |
| 2018/0345595 A1* | 12/2018 | Tanner .................... | B33Y 40/00 |
| 2019/0126548 A1* | 5/2019 | Barnhart ............... | B29C 64/241 |
| 2020/0055251 A1* | 2/2020 | Medalsy ................. | B29C 64/20 |
| 2020/0156311 A1* | 5/2020 | Rolland ................ | B29C 64/255 |

OTHER PUBLICATIONS

Annotated Figure 1, Barnhart et al., US 2019/0126548 A1, filed Nov. 2, 2017, published May 2, 2019 (Year: 2019).*
International Search Report and Written Opinion for Application No. PCT/US2019/050414, mailed Mar. 13, 2020 (19 pages).

* cited by examiner

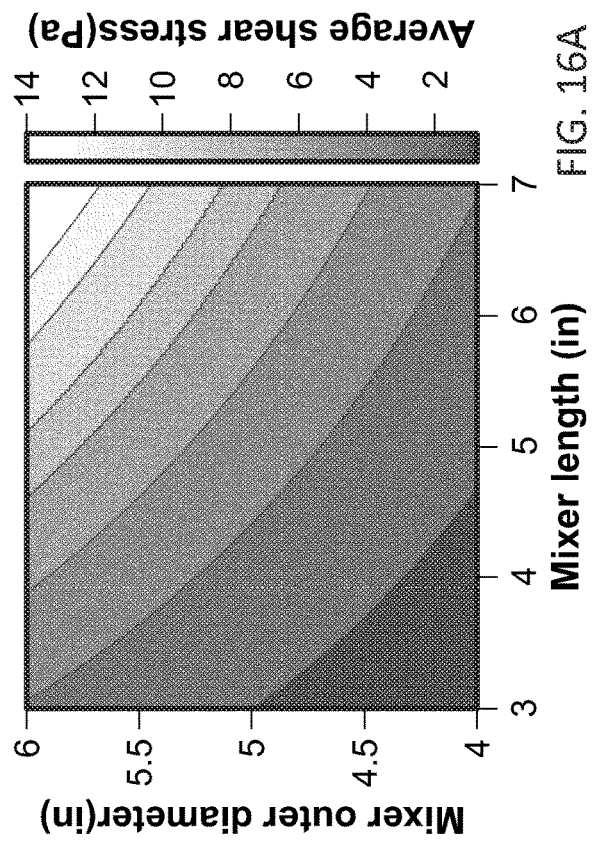

FIG. 16A

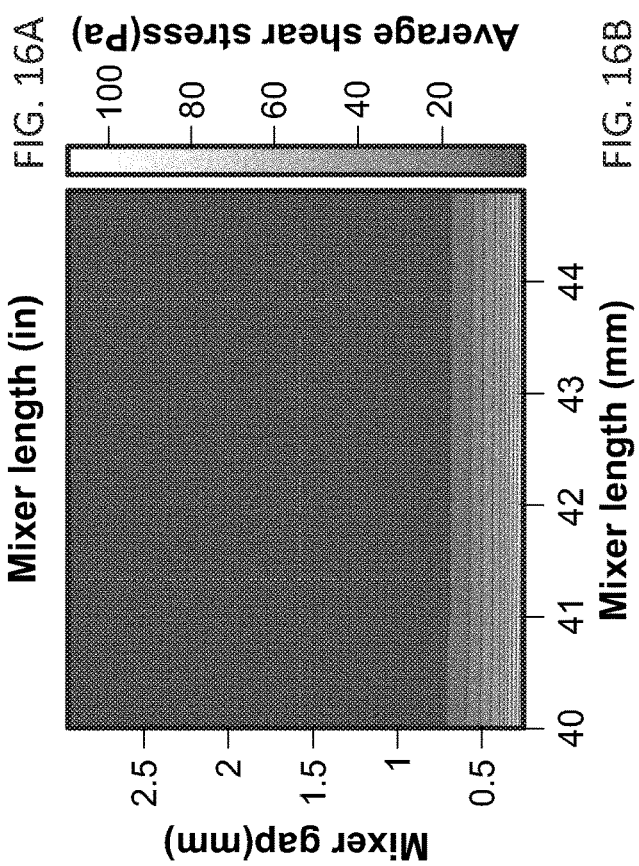

FIG. 16B $$r = \sqrt{R^2 - \frac{2V}{\pi L}}$$

$$\omega = \frac{T(R-r)}{2\pi \mu r^3 L}$$

$$W = \frac{60\omega}{2\pi}$$

$$\tau = \frac{\mu \omega r}{R - r}$$

r = inner cylinder radius [m]
R = outer cylinder radius [m]
V = mixer volume [L]
L = length of one mixer cylinder [m]
T = torque [N * m]
$\omega$ = rotational velocity $\left[\dfrac{rad}{s}\right]$
W = rotational velocity $\left[\dfrac{rotations}{minute}\right]$
$\mu$ = dynamic viscosity of fluid [Pa * s]
$\tau$ = shear stress [Pa]

FIG. 15

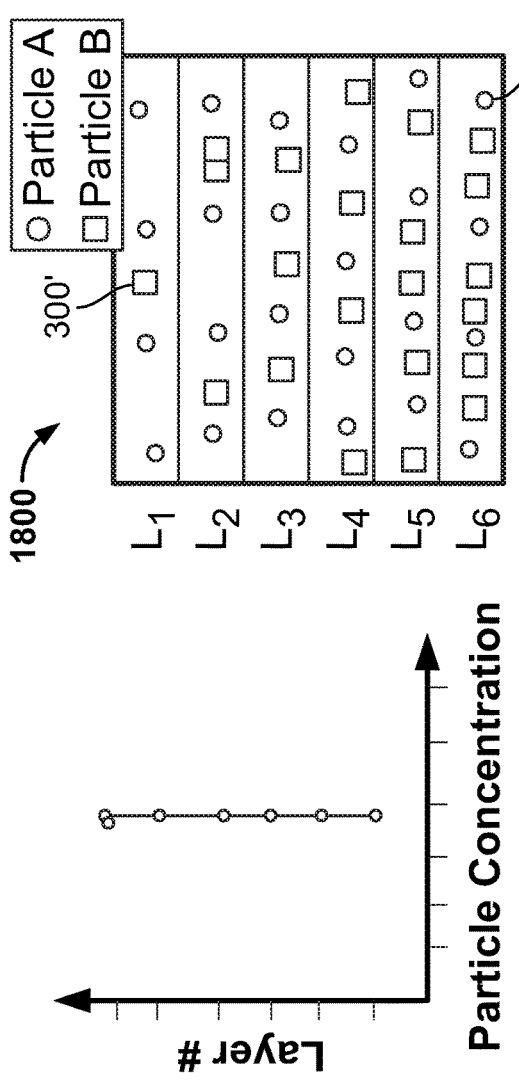
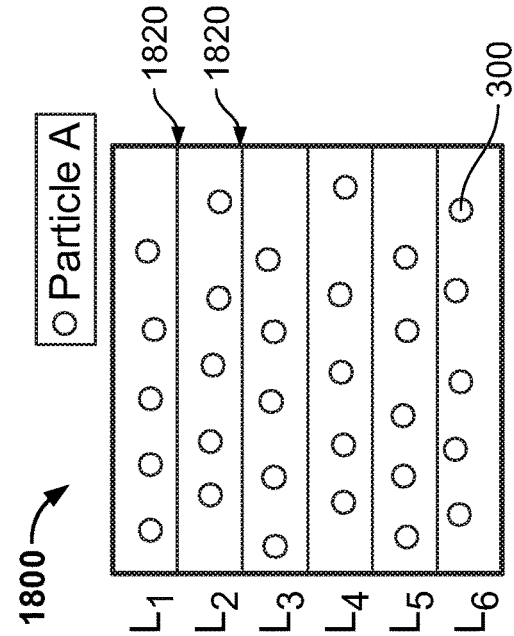
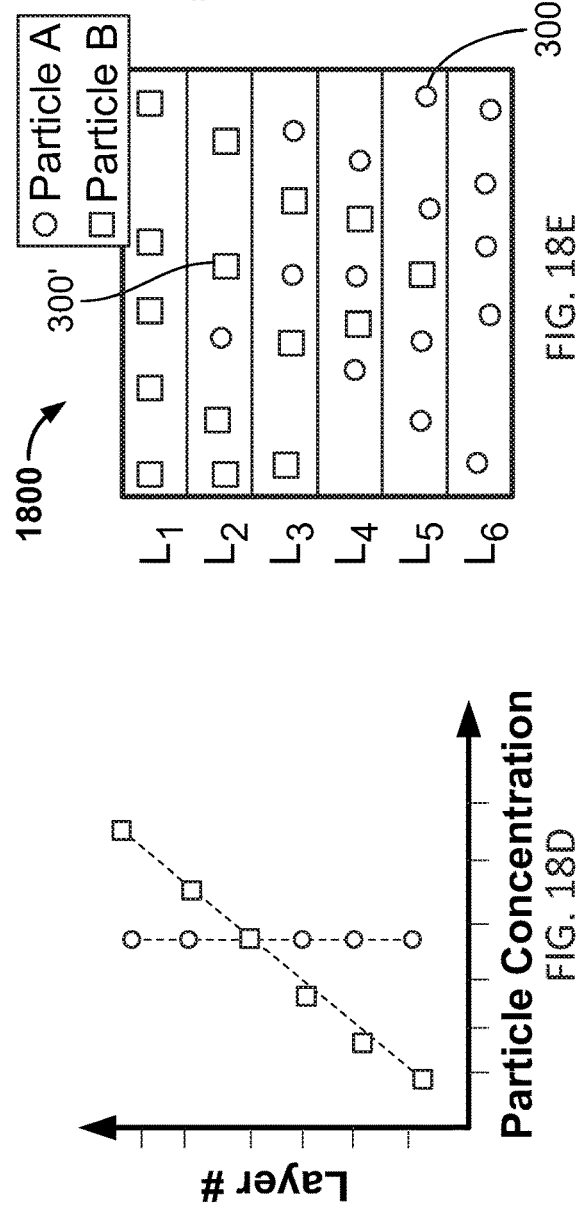
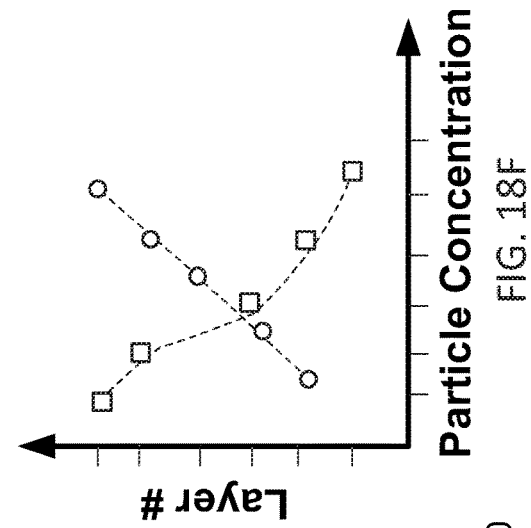
FIG. 18A
FIG. 18B
FIG. 18C
FIG. 18D
FIG. 18E
FIG. 18F

SYSTEMS AND METHODS FOR MIXING MATERIALS FOR ADDITIVE MANUFACTURING

CROSS-REFERENCE TO RELATED APPLICATION

This application is a § 371 National Stage of International (PCT) Application No. PCT/US19/50414 filed Sep. 10, 2019, which claims priority to and the benefit of U.S. Provisional Patent Application Ser. No. 62/729,120, filed Sep. 10, 2018, the disclosure of which is hereby incorporated by reference in its entirety.

FIELD OF THE INVENTION

Embodiments of the invention relate generally to additive manufacturing, particularly to systems and methods for mixing fluids for additive manufacturing applications.

BACKGROUND

Additive manufacturing (often referred to as three-dimensional printing) can be used to fabricate complex three-dimensional structures using materials such as polymers, metals, ceramics and composites. Material is added to build a part layer-by-layer using a variety of additive manufacturing processes. Additive manufacturing processes often require that the materials used to build each layer are homogeneously mixed and free of gas inclusions. In most cases, materials for additive manufacturing are formulated, mixed, and packaged before being integrated with the printing system. The polymer matrix in some additive processes, such as photo-curable printing (stereolithography) or liquid deposition modeling, is a liquid during the majority of the printing process. These materials use a variety of additives, pigments, dyes, and fillers to tune material performance. In some cases, particles are used to increase strength and stiffness of the neat polymer matrix. However, the solid components in a filled resin may have a density mis-match with the fluid, resulting in sedimentation. In some cases, some solid components may aggregate and prevent homogeneous material composition. Therefore, the quality of additive manufacturing processes can be limited by non-homogeneous sedimentation or aggregation of solid components in a composite mixture.

SUMMARY

Being able to formulate materials in-line with the printing system may present advantages in manufacturing, shipping, stability, and material property choices.

In an aspect, embodiments of the invention relate to an additive manufacturing apparatus including a mixer comprising an inlet and an outlet. A reservoir is in fluidic communication with the mixer. A build plate is disposed in parallel alignment with the reservoir.

One or more of the following features may be included. A reservoir pump may be configured to drive material from the outlet of the mixer into the reservoir through a conduit. A return pump may be configured to drive material from the reservoir.

A fluid dispensing system may be in fluidic communication with the mixer, the fluid dispensing system comprising at least one container. At least one pre-mixing pump may be configured to drive material contained in the at least one container through a conduit into the inlet of the mixer.

The mixer may include a fluid level sensor; the fluid level sensor may be in electrical communication with a control system.

The mixer may include an active mixer.

The mixer may include (i) an outer cylinder and (ii) an inner cylinder disposed inside the outer cylinder, with a gap defined between an outer surface of the inner cylinder and an inner surface of the outer cylinder.

The mixer may be in fluidic communication with a waste container.

A conduit may be in fluidic communication with the mixer and a waste container.

In another aspect, embodiments of the invention relate to an additive manufacturing apparatus that includes a mixer, and a solid particle dispensing system configured to dispense solid particles directly into the mixer.

One or more of the following features may be included. The solid particle dispensing system may include a load cell configured to measure a mass of solid particles. The solid particle dispensing system may also include a hopper configured to receive solid particles from a particle container, and the load cell may be configured to measure a mass of solid particles in the hopper. The solid particle dispensing system may include a solenoid controlled valve configured to start and stop the flow of a measured mass of solid particles from the hopper to the mixer.

A wire mesh may be disposed at an inlet of the hopper and/or an outlet of the particle container, configured to constrict flow of particles into the hopper.

A vibration motor may be configured to vibrate a particle container holder.

The solid particle dispensing system may include a particle container configured to dispense solid particles into an opening in the mixer, and the load cell may be configured to measure a mass of solid particles being removed from the particle container.

A fluid dispensing system may be in fluidic communication with the mixer.

In another aspect, embodiments of the invention relate to an additive manufacturing apparatus including a mixer, and a slurry dispensing system in fluidic communication with an inlet of the mixer and configured to dispense a pre-mixed formulation of resin and fiber directly into the mixer. A reservoir is in fluidic communication with the mixer. A build plate is disposed in parallel alignment with the reservoir.

One or more of the following features may be included. The slurry dispensing system may include an auger-driven dispensing system. The slurry dispensing system may include a pressure-driven dispensing system, a diaphragm pump, a syringe pump, and/or a peristaltic pump. A volumetric flow meter may be included to monitor the volumetric flow rate from the slurry dispensing system into the mixer.

In yet another aspect, embodiments of the invention relate to a method for handling precursors during additive manufacturing, including providing a first and a second precursor material to a mixer. The first and second precursor materials are mixed in the mixer. The mixed first and second precursor materials are transported directly to a reservoir disposed in parallel alignment with a build plate. At least a portion of the transported and mixed first and second precursor material is cured. The curing step is repeated at least once.

One or more of the following features may be included. A level of the first and second precursor materials in the mixer may be maintained at a fixed level during the transporting and curing steps. At least one of the first and second precursor materials may include a plurality of solid particles. The solid particles may have an average minimum largest dimension of 100 nm.

The mixer may include stationary outer cone and at least one rotating inner conical body. An outlet and an inlet to the mixer can be in fluidic communication with each other, and a circulation pump can be configured to circulate resin from the outlet on the bottom of the mixer to the inlet at the top of the mixer.

At least one of the first and second precursor materials may include a resin.

The first precursor material may include a resin, and a plurality of particles may be disposed therein and having an average minimum largest dimension of 100 nm, thereby forming a slurry, with a density of the resin being mismatched to a density of the particles.

A cleaning material may be circulated through the mixer and reservoir.

The transporting step may be repeated at least once.

An article of manufacture may be fabricated by this method. At least one of the first and second precursor materials may include a resin, at least a portion of the article may include a matrix including the cured resin and a plurality of solid particles, and a density of the particles in the cured resin may define a gradient. At least one of the first and second precursor materials may include a resin, at least a portion of the article comprises a matrix including the cured resin and a plurality of solid particles, and at least one of a mechanical, thermal, electrical, or electromagnetic property of the particles may define a gradient.

At least a portion of the article may include a resin and a plurality of particles, with a uniform dispersion of particles within each layer, or across multiple layers (also identified by striations) of the article. At least a portion of the article may include a resin and a plurality of particles, with at least one of a mechanical, thermal, electrical, or electromagnetic property of the particles defines a gradient.

In still another embodiment, a method for handling precursors during additive manufacturing includes providing a precursor material including a slurry including a resin and a plurality of particles disposed therein and having an average minimum largest dimension of 100 nm. The precursor material is mixed in the mixer. The mixed precursor material is transported directly to a reservoir disposed in parallel alignment with a build plate. At least a portion of the transported and mixed precursor material is cured. The curing step is repeated at least once.

One or more of the following features may be included. A density of the resin may be mismatched to a density of the particles. The transporting step may be repeated at least once. A second precursor may be provided to the mixer through a second inlet, and the precursor and the second precursor may be mixed in the mixer.

An article of manufacture may be fabricated by this method. At least a portion of the article may include the resin and plurality of particles, with the density of the particles in the resin defining a gradient. At least a portion of the article may include the resin and a plurality of particles, with at least one of a mechanical, thermal, electrical, or electromagnetic property of the particles defining a gradient.

In yet another aspect, an article of manufacture includes a plurality of adjacent layers, each layer including a matrix including a cured resin, and a plurality of particles disposed in the matrix. An edge of each layer defines a striation in a surface of the article, and (ii) a concentration of the particles per square millimeter varies by no more than ±50% across the plurality of adjacent layers.

One or more of the following features may be included. The concentration of particles may vary by no more than ±5% between two directly adjacent layers and by no more than ±25% across the plurality of adjacent layers. The concentration of particles in each of the two adjacent layers may be an average of concentration of particles in ten individual square millimeters within each layer. The particles may include a polymer, a metal, and/or a ceramic. The cured resin may include at least one cured liquid precursor such as acrylic, methacrylate, polyurethane, and/or epoxy.

In another aspect, an article of manufacture including a plurality of adjacent layers, each layer including a plurality of adjacent layers, each layer including a matrix including a cured resin, and a plurality of particles of at least one type disposed in the matrix. An edge of each layer defines a striation in a surface of the article. Each type of particle defines a controlled concentration gradient through the article and perpendicular to a plane defined by one of the layers. One or more of the following features may be included. Each layer may have a thickness of at least 5 microns. The cured resin may include at least one cured liquid precursor, such as acrylic, methacrylate, polyurethane, and/or epoxy. Each type of particles may be at least one of a polymer, a metal, and/or a ceramic. The plurality of solid particles may include at least two types of particles, and a concentration of a first particle type may be independent of a concentration of a second particle type.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

FIG. 15 shows the fundamental equations for evaluating mixer dimensions and shear stress in the mixer.

FIGS. 16A and 16B are graphs illustrating average shear stress in the mixer as a function of mixer outer diameter and mixer length, as well as average shear stress in the mixer as a function of length and mixer gap.

FIGS. 18A and 18B depict an article and corresponding graph, the article having a uniform concentration gradient, illustrating striations due to layer boundaries, a matrix (cured resin), and particles, in accordance with an embodiment of the invention.

FIGS. 18C and 18D depict an article and corresponding graph, the article including multiple types of particles, with the concentration of one type of particle can be held constant throughout the article and the concentration of a different type of particle being independently controlled and varied at a linear rate, in accordance with an embodiment of the invention.

FIGS. 18E and 18F depict an article and corresponding graph, the article including multiple types of particles, with the concentration of one type of particle being varied at a linear rate throughout the article and the concentration of a different type of particle being independently controlled and varied at a non-linear rate, in accordance with an embodiment of the invention.

DETAILED DESCRIPTION

Disclosed herein are mixer-based dispensing systems suitable for use with an additive manufacturing apparatus. Such systems enable maintaining homogeneous mixtures of printing fluids and preventing aggregation in fluid materials with solid filler particles. A suitable mixer can include a container formed from concentric rotational bodies that stores material in the volume between the bodies. The relative rotation of the bodies creates shear forces in the material to maintain a homogenous solution and break up any aggregation of filler material.

Figure 1:
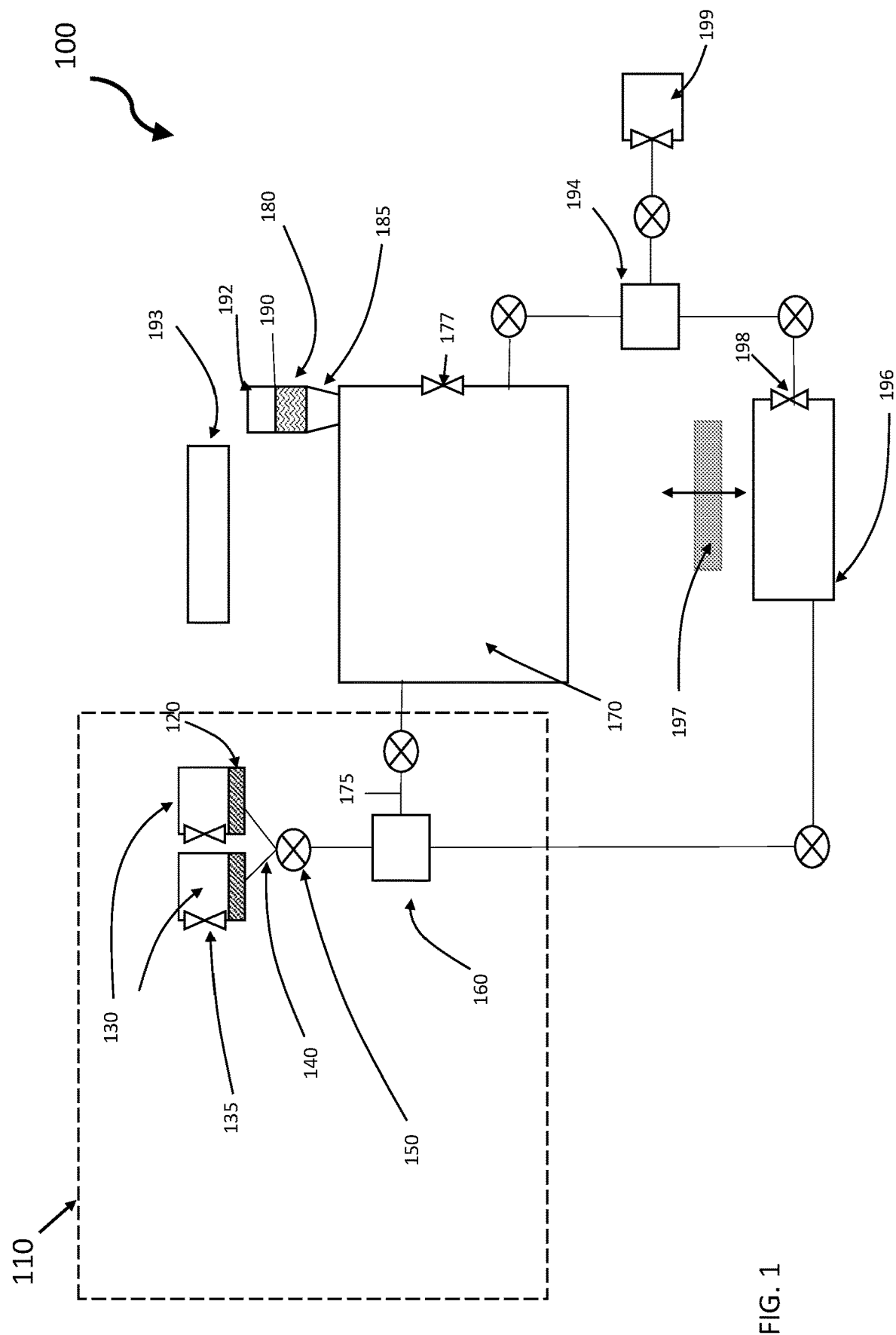
FIG. 1 is schematic drawing illustrating a mixing and dispensing system for an additive manufacturing apparatus in accordance with an embodiment of the invention.

Referring to FIG. 1, in accordance with embodiments of the invention, an additive manufacturing apparatus 100 includes a mixing and dispensing system allowing homogeneous mixing and delivery of materials used in stereolithographic printing processes.

The mixing and dispensing system may include a fluid dispensing system 110. The fluid dispensing system may include a fluid material dock 120 configured to receive at least one fluid material container 130, each fluid material container configured to hold a fluid or dispersion of solid particles. Preferably, the dock 120 is configured to receive a single fluid material container, thereby greater flexibility in system arrangement. A suitable dock may be a hard plastic housing configured with a plastic nipple valve, or with a male or female quick connect (e.g., a 5/16" male quick release coupling, manufactured by MFPF). Each of the containers may be configured to be interchangeable or fixed, allowing for quick refill or replacement. Each of the containers may be sized to hold up to several liters of material and fitted with a male or female quick release coupling. A suitable container 130 is a high-density polyethylene container, with an outlet configured to couple with the quick release coupling.

A fluid level sensor 135 may be configured to detect a fluid level in the material container. A suitable fluid level sensor 135 is the UNDK 20U6914/S35A Ultrasonic Distance Measuring Sensor available from Baumer.

The dock may be connected to a first conduit, e.g., a flow-controlled conduit 140. A suitable flow-controlled conduit may be, for example, plastic or metal tubing or piping. The first conduit may also have at least one flow controller 150, with a flow-metering device and a flow valve, capable of precisely controlling the amount of material transported from the fluid dispensing system to the mixer. An exemplary suitable flow-metering device is the LIQUID 1 inline digital flowmeter manufactured by Sotera. An exemplary flow valve is a DEELAT motorized ball valve.

The flow controller may be connected to a pre-mixing pump 160. A suitable pre-mixing pump 160 is, e.g., a diaphragm pump, syringe pump, piston pump, peristaltic pump, and/or worm pump. The pre-mixing pump may be configured to drive material contained in at least one of the fluid material containers into the first conduit. The type and capacity of the pre-mixing pump may be selected by taking into account the amount of material to be handled by the mixing and dispensing system. For example, for a peristaltic pump, the rpm and flow rate may be specified depending on the application.

The pre-mixing pump may be connected to a mixer 170 by a conduit 175, such as a plastic or metal pipe. The material of the conduit may be selected to be inert to the fluidic compositions that will be transferred therethrough. The mixer 170 may include a fluid level sensor 177, to measure a level of fluid in the mixer. The fluid level sensor may be in electrical communication with control system 193.

Figure 2:
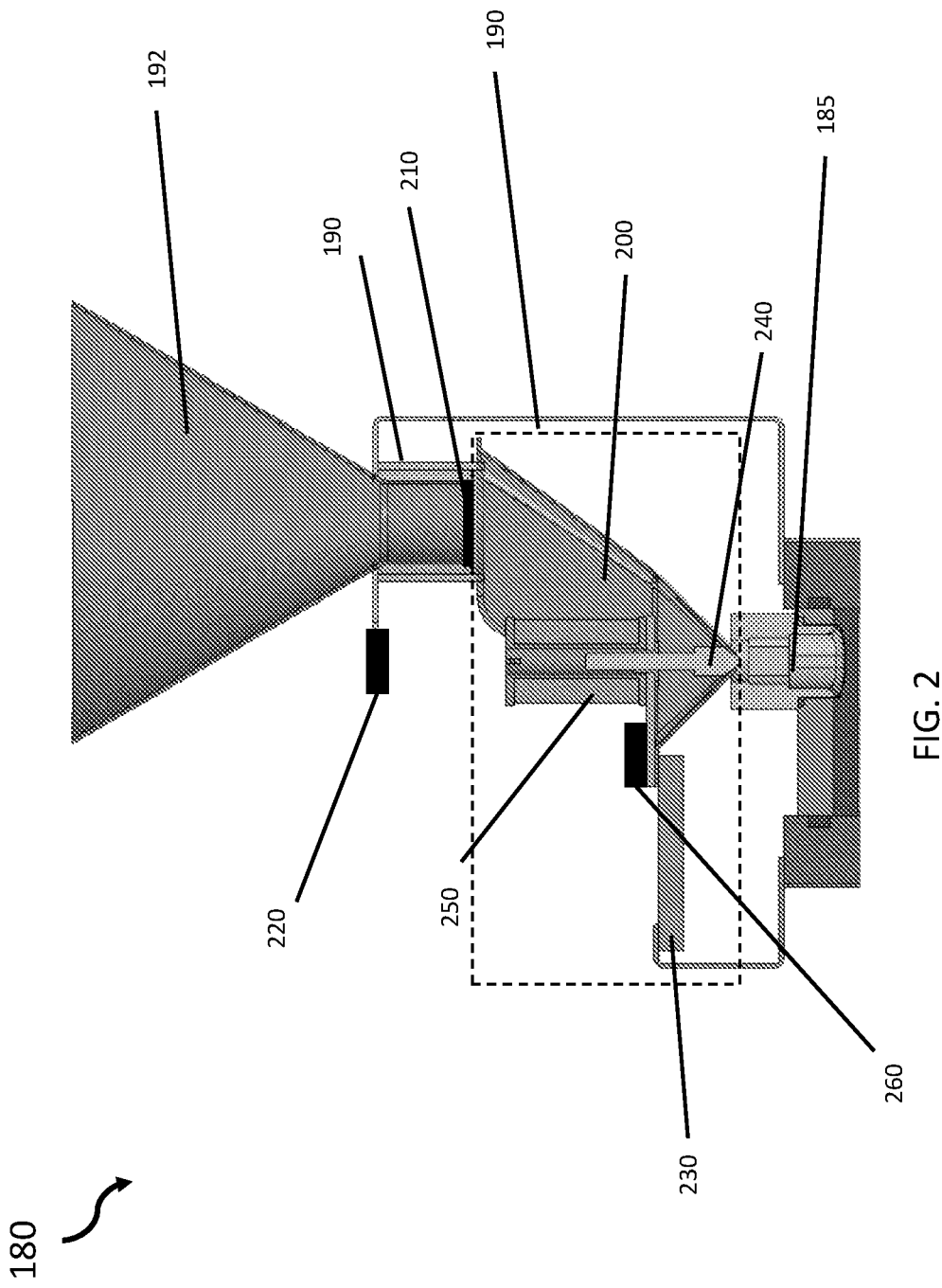
FIG. 2 is a schematic drawing illustrating a particle dispensing system in accordance with an embodiment of the invention.

In some embodiments, the mixer may also be connected to a particle dispensing system 180 by a particle transfer channel 185. A suitable particle dispensing system may include a particle container holder 190 configured to mate with a particle container 192. For example, as shown in FIG. 2, the particle container holder may be an aluminum bracket mounted to a mixer at one end and defining a frame capable of holding the particle container at a second end.

In some embodiments, the mixer may be configured with multiple particle dispensing systems (not shown) such that more than one particle type can be added to the mixer at a time. This provides an advantage of being able to change the resin formulation over the course of a print, and enable multiple types of particle additives to be used.

A control system 193 is configured to allow a user to control material selection and flow, as described in detail below.

The mixer may have two inlets: one for fluid material, e.g., through conduit 175 and one for a solid particle dispensing system (i.e., the particle transfer channel 185). The mixer may be connected to a reservoir pump 194, which in turn may be connected by a conduit, e.g., a flow-controlled conduit, to an additive manufacturing reservoir 196.

In some embodiments, the pre-mixing pump 160 is also in fluidic communication with an additive manufacturing reservoir 196. A suitable reservoir can receive material for additive manufacturing, and is in parallel alignment with a build plate 197, i.e., above or below the surface of the printing material in the reservoir. In some cases, material may be transferred to the reservoir from the mixer. In some cases, material can be transferred straight to the reservoir from the material containers 130. This provides the ability to modify the formulation of the material being printed throughout the course of the print, allowing for tunable gradients of mechanical, thermal, electrical, or electromagnetic properties.

A typical additive manufacturing reservoir is a fluid container configured to receive additive manufacturing material. The reservoir may be configured with a fluid level sensor 198. An example of an additive manufacturing system including a reservoir and build plate suitable for use with embodiments of the invention is M2 available from Carbon 3D, or the reservoir used for the Admatech AdmaFLEX printing system.

In some embodiments, the reservoir pump 194 may be configured to drive material from the reservoir, e.g., to a waste container 199 or back to the mixer. Driving material to a waste container from the reservoir has the advantage of being able to empty the material in the reservoir. This allows the user to automate changing the type of resin in the reservoir, whereas conventional means require manual labor to clean out the old resin or to change the reservoir entirely. In addition, driving material from the reservoir to the mixer allows the user to re-mix the material, mitigating the effects of sedimentation and aggregation of particles, or even modify the resin formulation by adding precursors from the material and/or particle containers.

Referring to FIG. 2, a suitable particle container 192 may be configured to hold solid particles. The particle dispensing system 180 may be configured to dispense precise quantities of particles to the mixer. For example, the particle container may cone-shaped, with a dispensing opening at a bottom portion of the particle container.

The particle dispensing system may include a hopper 200 configured to receive particles from the particle container. The hopper may have tapered features, collecting solid particles and funneling them towards an opening at the bottom of the hopper. A suitable hopper, for example, may be made out of plastic or metal.

An inlet of the hopper or outlet of the particle container may be covered by a wire mesh 210, which may control the flow rate of particles from the particle container into the hopper. The size of the wire mesh openings may be adjusted based on the size of particles being dispensed from the particle container. Depending on the material being processed, mesh size may vary, e.g., from No. 5 to No. 400.

The particle container holder may be connected to a particle vibration motor 220 capable of driving particles from the particle container to the particle hopper. In some embodiments, the particle vibration motor may be attached directly to the particle container. An exemplary vibration motor is an eccentric rotating mass vibration motor, such as a 3V 1100 ROMP mini vibration motor, manufactured by Uxcell.

A particle scale assembly, e.g., a load cell 230, may be configured to collect and measure the mass of particles dispensed from the particle container. The particle scale assembly may be connected to the hopper. The hopper may be asymmetric in order to avoid geometric interferences with other elements of the particle scale assembly. A load cell may be attached to the particle hopper, with the load cell being in electrical communication with the control system 193. The load cell may transmit mass measurements to the control system. A suitable load cell is a single point load cell, such as the OEM style single point load cell available from OMEGA.

An opening at the bottom of the particle hopper may be oriented above the opening of the particle transfer channel. A plunger 240, such as a plunger in a solenoid, may be disposed to close the opening at the bottom of the hopper. The solenoid may be mounted to a side of the hopper or inside the hopper (not shown). In some cases, the plunger may also be in contact with a spring, that pushes the plunger into contact with the hopper opening. The plunger may be lifted upwards against gravity or the spring force by an electromagnet 250 that is positioned above the hopper. The plunger may be comparable to a poppet valve. The plunger may have a tapered tip in order to ensure contact with the circular opening of the hopper. The electromagnet may be in electrical communication with the control system 193. When the desired mass of particles are detected in the hopper, as indicated by the mass measured by the load cell, the solenoid plunger may be retracted from the opening, enabling the flow of the measured mass of particles into the mixer.

The hopper may be coupled to a hopper vibration motor 260 that may facilitate the flow of particles from the hopper into the particle transfer channel. A single vibration motor (not shown) may be used to vibrate the hopper and the particle container holder, or two separate motors may be used. Vibration of the particle container holder, or the particle container itself, is advantageous because it stimulates the flow of particles through the opening of the particle container without exerting high mechanical forces onto the fibers that could cause them to break down. In some embodiments (not shown) it may be advantageous to use a method of dispensing particles other than vibration, such as a rotating auger.

The flow of particles from the particle container may be controlled in various ways. For example, in some embodiments, a particle container plunger may be used to control the flow of particles from the particle container instead of a wire mesh. The gap between a plunger and a hopper or particle container opening may be varied in order to control the flow rate of solid particles. This allows for more control of the particle transfer rate. In other embodiments the hopper may be oriented so that the tapered tip of the plunger is oriented upwards, and actuated downwards by an electromagnet to control the flow of solid particles. This provides the advantage of having the plunger reside outside of the funnel, which may prevent potential build-up of fiber on the plunger. In some implementations, a wire mesh may be used in combination with a vibration motor to control the flow of particles from the hopper to the particle transfer channel. Advantageously, the addition of agitation to the particles in the funnel leads to more consistent material transfer.

Figure 3:
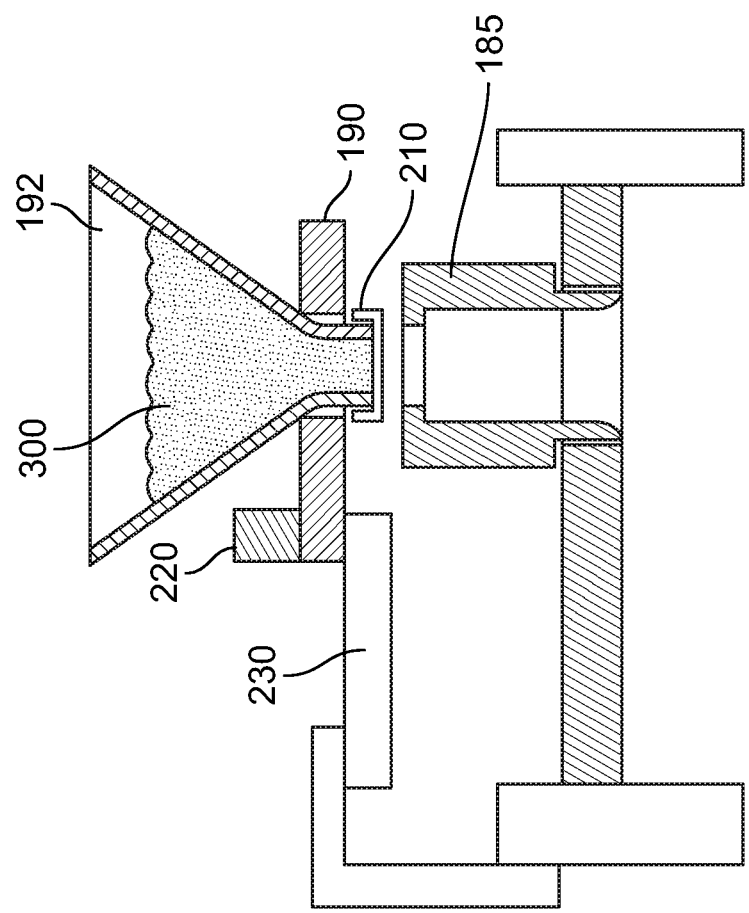
FIG. 3 is a schematic drawing illustrating a particle dispensing system in accordance with an embodiment of the invention.

Referring to FIG. 3, in some embodiments, the particle dispensing system may be configured without a hopper between the particle container and the particle transfer channel. In these implementations, the particle container 192 may be oriented on a load cell 230, which is in direct communication with the controller. A wire mesh 210 may be disposed at the opening of the particle container holder. A vibration motor 220 may be coupled to the particle container holder. The opening of the particle container may be oriented above an opening in the particle transfer channel. The vibration motor may be activated in order to initiate the dispensing of particles 300 through the wire mesh 210. The load cell may measure the mass lost from the particle container while particles are dispensed. Once a target mass has been reached, the vibration motor may be turned off to stop the dispensing of particles. This embodiment has the advantage of having fewer components over all, and allows for direct transfer to the mixer.

Figure 4A:
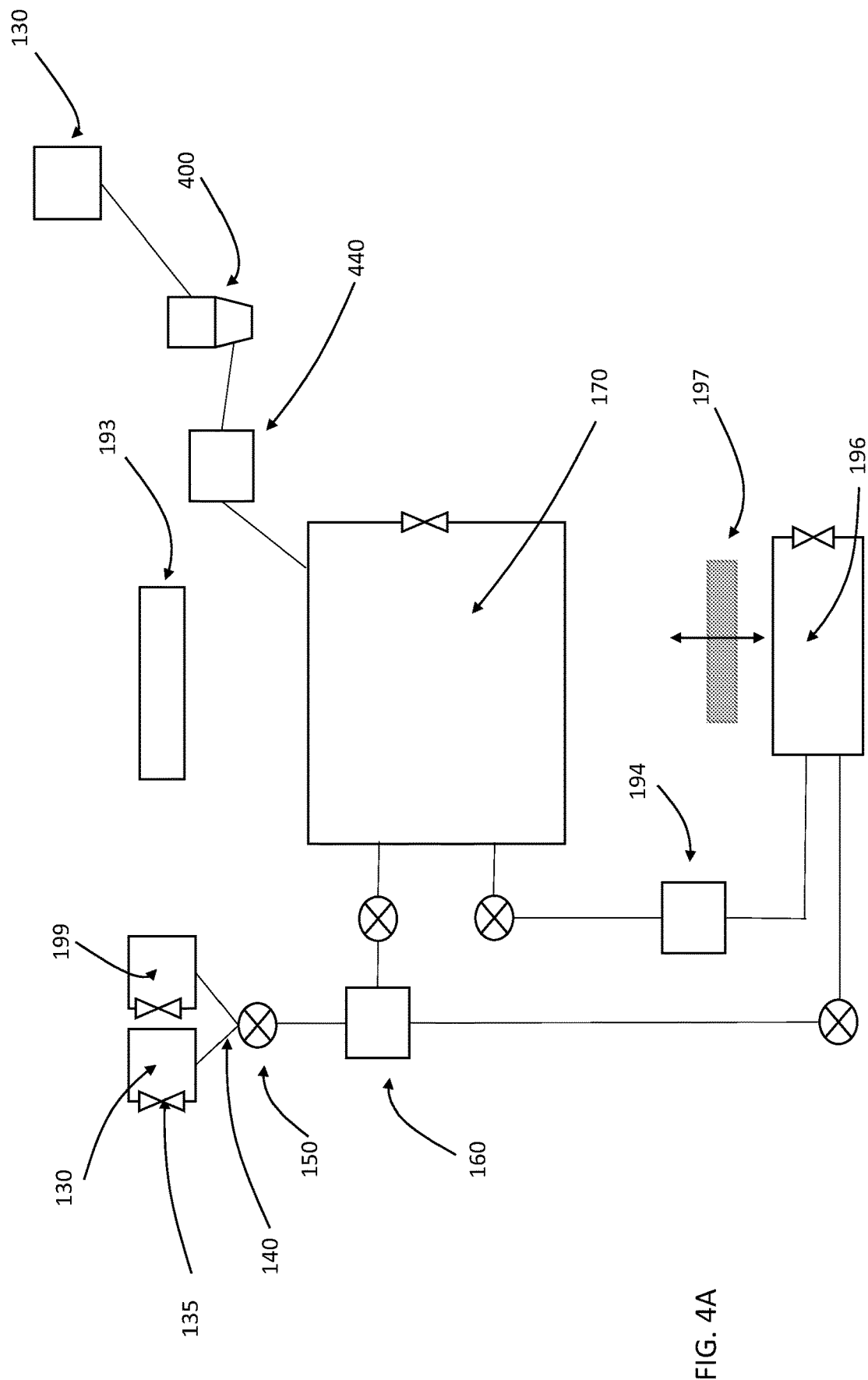
FIG. 4A is a schematic drawing illustrating a mixing and dispensing system for an additive manufacturing apparatus, in which a slurry dispensing system is in fluidic communication with the mixer, in accordance with an embodiment of the invention.
Figure 4B:
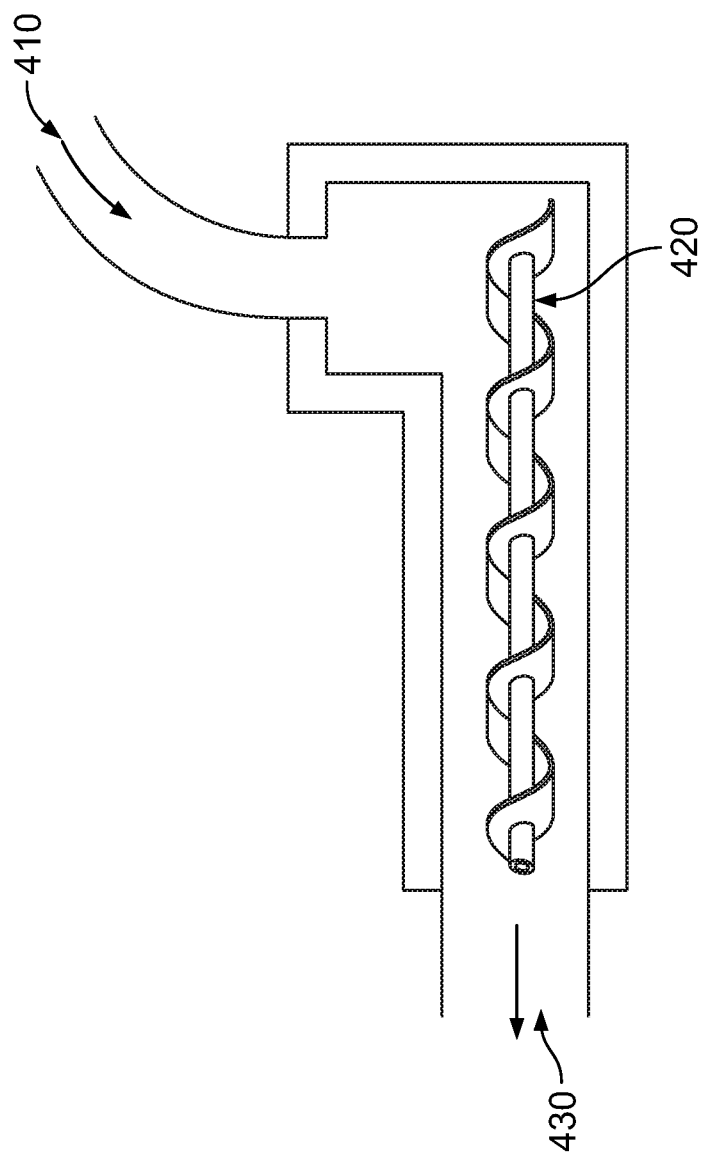
FIG. 4B is a schematic diagram illustrating a suitable slurry dispensing system for use with embodiments of the invention.

Referring to FIGS. 4A and 4B, in some embodiments, the mixer can be in fluidic communication with a slurry dispensing system 400. A suitable slurry dispensing system includes a slurry inlet 410 for receiving a slurry from a material container 130, and also includes an auger volumetric dispensing mechanism 420 for transporting slurry from the inlet through a channel 430 to the mixer. An example of a commercially available unit with this auger dispensing functionality is the Precision Auger Pump available from GPD Global. Another suitable slurry dispensing system may be a pressure-driven dispensing system, configured to drive a plunger in a slurry material container by pressurizing the volume behind the plunger. An example of a commercially available unit with this pressure dispensing functionality is the Ultimus V High Precision Dispenser offered by Nordson EFD. Other suitable slurry dispensing systems are a diaphragm pump, a syringe pump, or a peristaltic pump. In some embodiments, a volumetric meter can be used to control the volumetric flow rate of the slurry out of the dispensing system. A volumetric flow meter 440 may be installed between the slurry dispensing system and the mixer 170. An example of a suitable volumetric meter is the Omega Low Flow Magmeter from Omega. A hose connecting the material container, the slurry dispensing system, the volumetric meter, and the mixer can be rigid, such as stainless steel, to be strong under pressures and allow for faster flow rates.

In use, the slurry dispensing system may deliver to the mixer a slurry, i.e., a pre-mixed, high volume fraction formulation of resin and particles. An example of a slurry is an epoxy resin filled with 10 micron diameter glass beads.

The slurry can be added to the mixer through an inlet in the mixer. The pre-mixed slurry has a high viscosity of 10,000 to 1,000,000 centipoise and therefore may be accurately dispensed using a system such as an auger-style dispensing system. The slurry may be mixed inside the mixer with neat resin to dilute the high volume fraction slurry down to a target volume fraction. Mass or flow rate sensing may, optionally, be used to accurately determine the volume of slurry added to the mixer.

Figure 5:
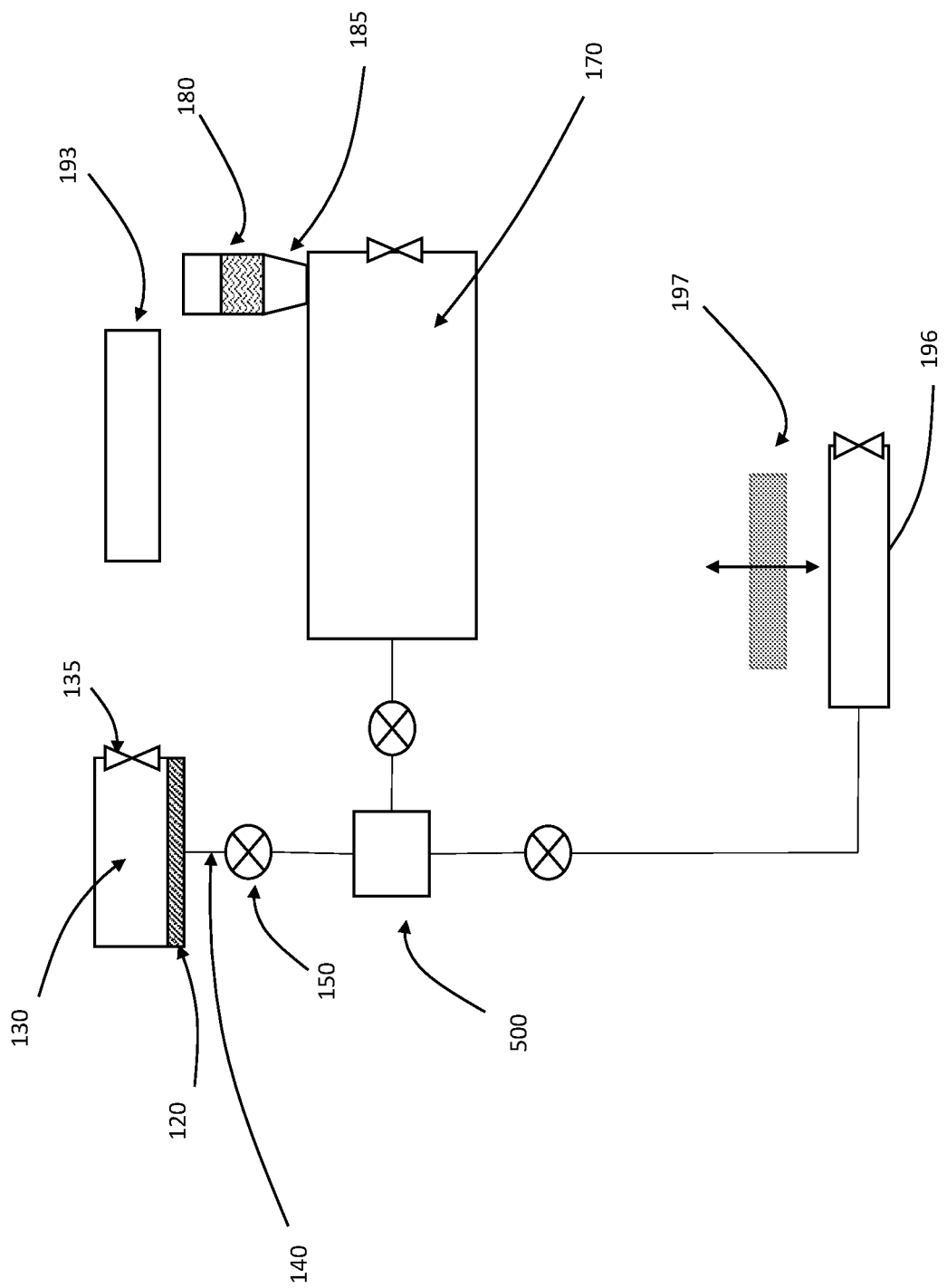
FIGS. 5 and 6 are schematic drawings illustrating mixing and dispensing systems for an additive manufacturing apparatus in accordance with alternative embodiments of the invention.

Referring to FIG. 5, in some embodiments, the reservoir and pre-mixing pumps can be the same pump 500. This has the advantage of reducing the amount of sub-systems required and can be done assuming there are adequate inlets and outlets to the pump 500.

Figure 6:
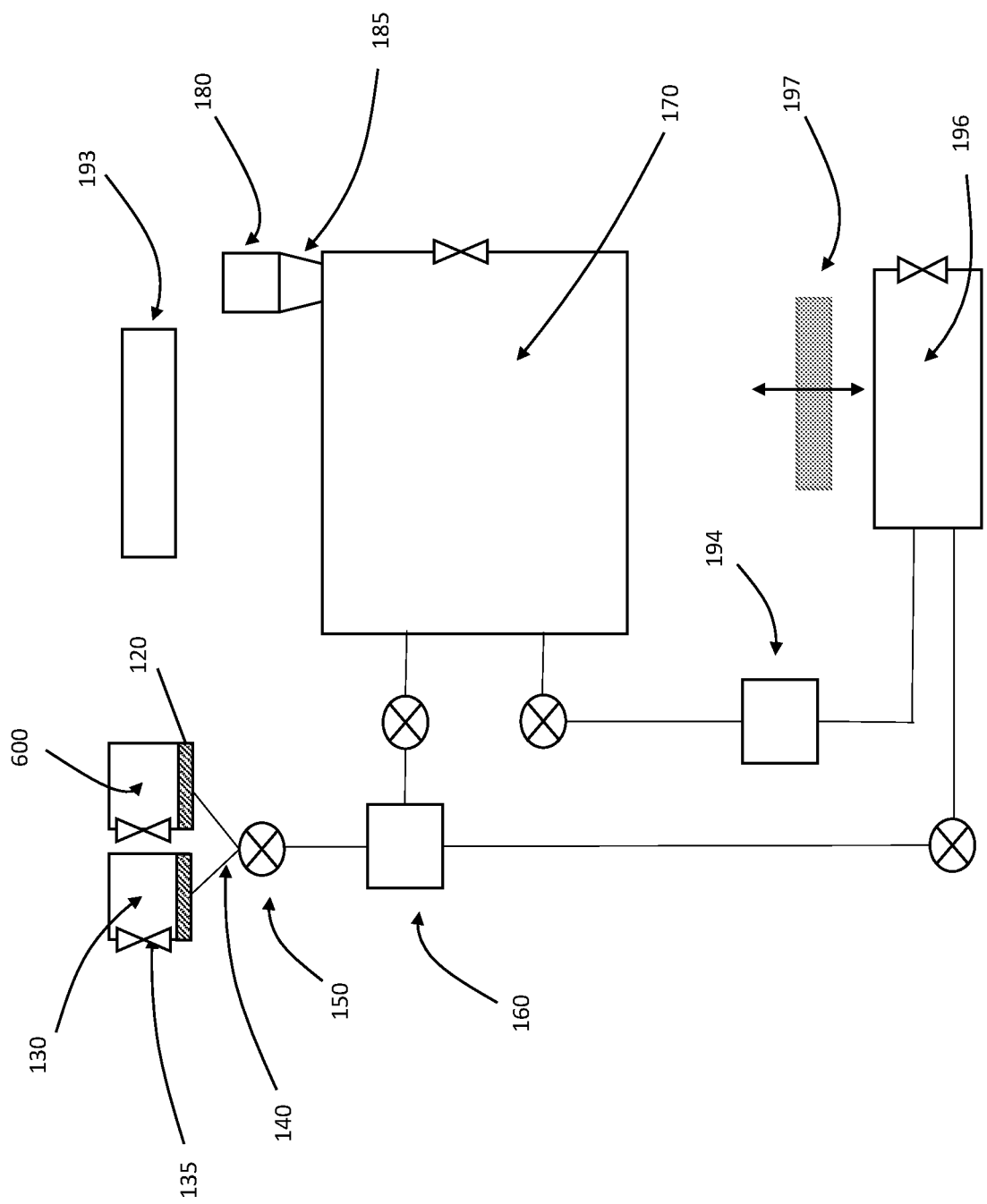

Referring to FIG. 6, in some embodiments, one of the docks 120 may receive a waste container 600. The waste container 600 may be used to receive excess material from the mixer 170 and/or the reservoir 196. The waste container may have the same configuration as a fluid material container 130. This embodiment provides the advantage of keeping the material supply and waste containers in one location.

In some embodiments, multiple flow-controlled conduits may be installed to each material container, pump, flow controller, reservoir, and mixer in order to allow for material flow both in and out of each connection point. This provides the advantage of not combining different materials within the flow-controlled conduits.

Mixer Assembly

The mixer 170 may have one of many different configurations, including the configurations described in detail below with respect to FIGS. 7-14. In some embodiments, the mixer is an active mixer. An active mixer is one that uses moving parts to mix materials, as opposed to a "static" mixer, which is a motionless device for inline continuous blending of fluids. With no moving parts, static mixers (such as a mixing nozzle) utilize the energy of the flow stream to generate mixing.

In some embodiments, the mixer can include two inner cylinders disposed inside a hollow outer cylinder. Each of the two inner cylinders is preferably solid. The inner cylinders can be positioned coaxially with respect to the hollow outer cylinder. The inner cylinders can be axially mounted on motors, and the motors can be mounted to the external end plates of the mixer to drive rotation. The first conduit may be configured to deliver fluid to the gap, e.g., fluid transferred from the fluid containers.

Figure 7:
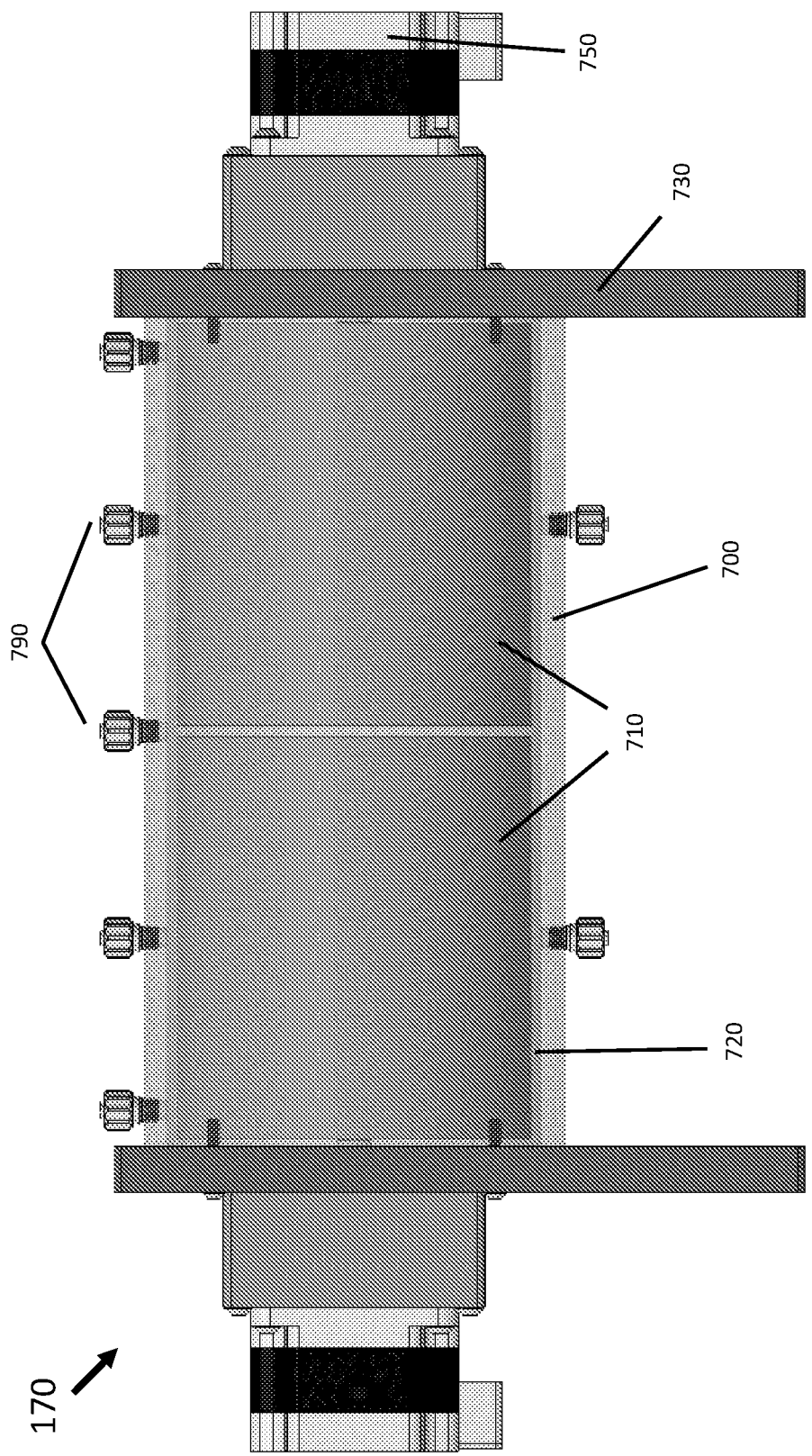
FIG. 7 is a perspective view of an exemplary mixer for additive manufacturing, having two solid cylinders disposed inside one hollow cylinder, suitable for use with embodiments of the invention.
Figure 8:
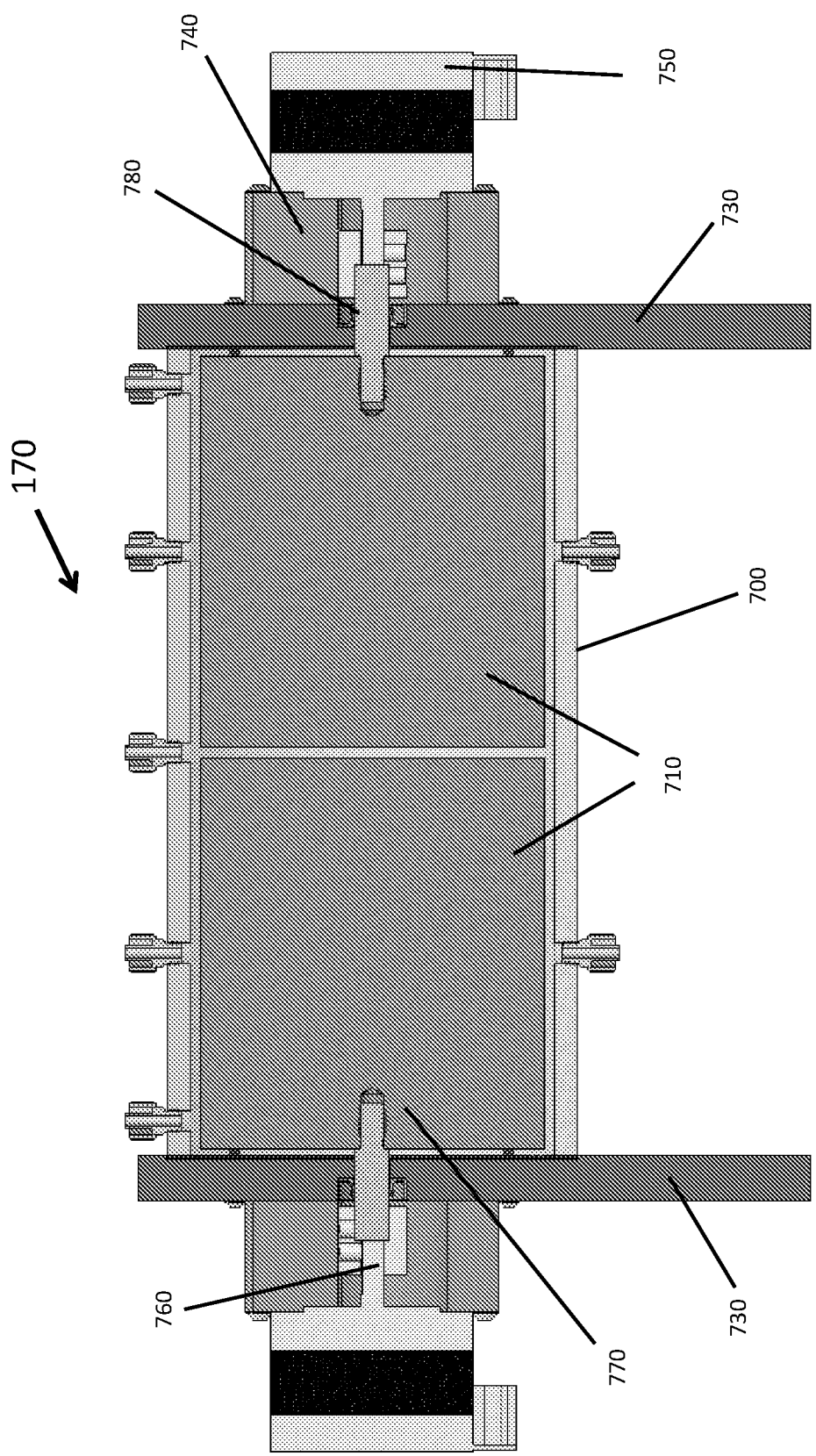
FIG. 8 is a cross-sectional view of the mixer of FIG. 7, including ports to connect to fluid dispensing lines and vacuum lines, suitable for use with embodiments of the invention.

Referring to FIG. 7 and FIG. 8, in an embodiment, the mixer 170 may include a hollow outer cylinder 700 and two solid inner cylinders 710. The inner and outer cylinders may be made of a chemically resistant material, such as aluminum or high density polyethylene. The inner cylinders are preferably configured to rotate within the hollow outer cylinder in opposite directions relative to each other. A gap 720 may be defined between an outer surface of at least one of the inner cylinders and an inner surface of the outer cylinder. The open ends of the hollow outer cylinder 700 can be mounted to external end plates 730 that confine the mixer's volume. Each endplate preferably has a mounting bracket 740 for mounting motors 750 and allowing the shaft 760 of the motor to pass through the endplates 730. Mounting features 770 may include threaded holes that match the mounting holes of the motor, and a through hole centered in the plate. The mounting bracket may be machined out of metal or plastic, and configured to mount the motor to the end plate while aligning the motor shaft with the inner cylinder. The motor shaft 760 may pass through an opening in at least one of the endplates. A sealing component at this opening can be used to create a fluid seal between the endplate and the motor shaft, allowing for shaft rotation but preventing fluid from passing. An exemplary sealing component 780 is a rotary shaft seal (such as an oil and grease seal dual spring covered double lip from VXB). The endplates preferably also have mounting features for attaching the cylinder (see FIG. 9), i.e., the hollow outer body of the mixer to the endplates, such as threaded holes. A sealant may create a fluid seal at the mate of the endplate and hollow outer body.

Each of the inner rotational bodies, i.e., inner solid cylinders 710, of the mixer can define a threaded hole 770 centered on a symmetrical axis of the solid cylinder on one of the flat end faces of the cylinder. The motor shaft can be threaded or coupled to a threaded rod, and the cylinder can thread onto the motor shaft or threaded rod to mate the cylinder rotationally with the motor.

The hollow outer cylinder of the mixer can be configured with a number of ports 790. These ports define inlets and outlets for moving fluid and slurries into and out of the mixer. Threaded holes can be drilled into the underside of the hollow body so that hose fittings can be threaded into the body for fluid movement.

Figure 9:
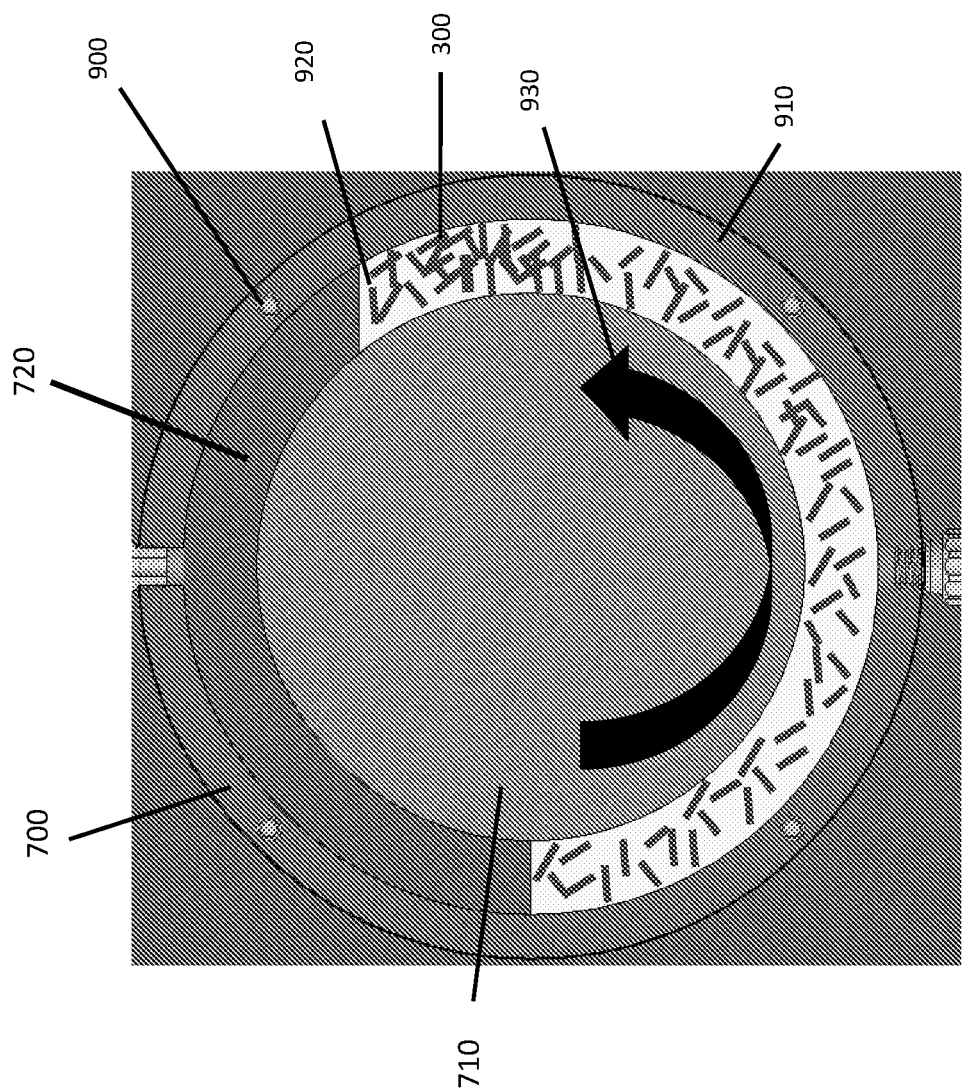
FIG. 9 is a cross-sectional view of the mixer of FIG. 7, illustrating how, in use, the mixer's shear forces create a hydrostatic imbalance and forces a higher concentration of fibers on one side of the mixer.

Referring also to FIG. 9, the hollow outer cylinder 700 can be positioned accurately relative to both of the endplates by using cylinder mounting features 900 such as dowel pins pressed into the outer cylinder that fit into pin and slot pockets machined into the endplates. The pin anchors the position and the slot constrains the rotation of the two parts relative to one another. A sealant 910, such as a rubber gasket or O-ring, can be inserted between the flat end face of the hollow outer cylinder and the mating face of the endplate to contain the contents of the mixer volume and prevent leaking. A suitable O-ring may be one made of Viton, EFP, or another suitable elastomer.

In use, the relative rotation of each inner cylinder 710 independently creates a high shear force on the fluid 920 in the gap 720 between each inner cylinder 710 and the hollow outer cylinder 720. This shear force causes motion of solid particles 300 in the fluid. In some cases, non-homogeneous particle dispersions may be concentrated on one side of a rotating cylinder based on its rotational direction. Therefore, having the cylinders 710 rotate in opposite directions 930 leads to a reduction of particles concentrating on one side of the mixer 170, which may lead to non-homogeneous mixing.

Figure 10:
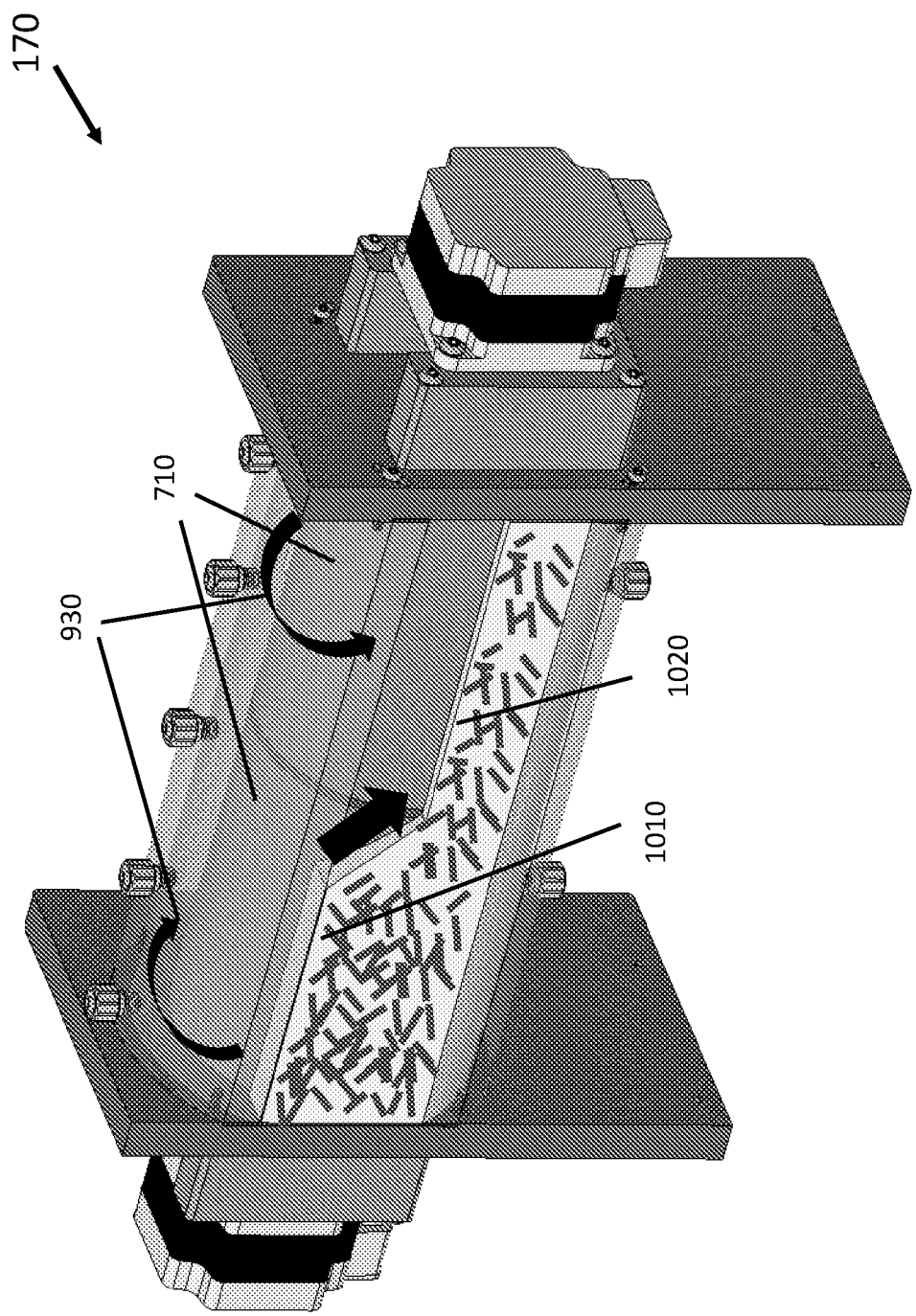
FIG. 10 is a perspective view of an exemplary mixer with two solid cylinders configured to rotate in opposite directions inside one hollow cylinder, suitable for use with embodiments of the invention.

Referring to FIG. 10, as well as to FIG. 9, an exemplary mixer 170 may have two solid inner cylinders 710 configured to rotate in opposite directions 930 inside one hollow outer cylinder 700. By spinning the inner cylinders in opposite directions, the greater hydrostatic pressure caused by uneven fluid levels 1010 on the side of one cylinder feeds fluid directly into the lower fluid level 1020 on the adjacent cylinder. This imbalance passes highly concentrated particle dispersions to the adjacent cylinder, where it is recirculated around the adjacent cylinder by the shear forces. This hydrostatic cycling can homogeneously disperse the solid particles in the fluid. The spacing between the two inner cylinders can be made sufficiently small to ensure bulk motion of a majority of the fluid due to the hydrostatic cycling.

Figure 11:
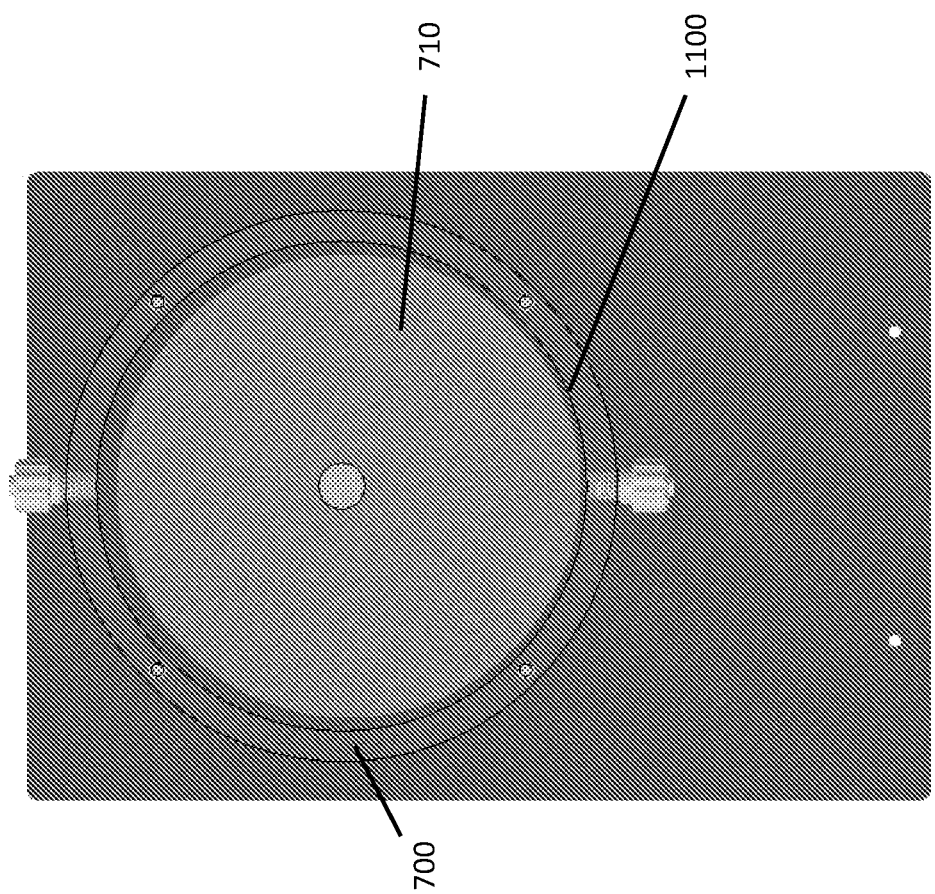
FIG. 11 is a cross sectional view of an exemplary mixer having a hollow outer cylinder configured to rotate relative to a concentric, stationary inner cylinder, suitable for use with embodiments of the invention.

FIG. 11 illustrates a mixer configuration in which a solid inner cylinder 710 rotates within a stationary hollow outer cylinder 700, and the rotational center axis of the inner cylinder is not shared with the center axis of the outer cylinder, so that the two bodies are not concentric. This creates a localized area of high shear 1100, i.e., a high shear gap disposed between the two cylinders. This configuration may be beneficial because the mixer volume can be maintained, but the material inside the mixer can be forced through a region of high shear and still mix effectively.

Figure 12:
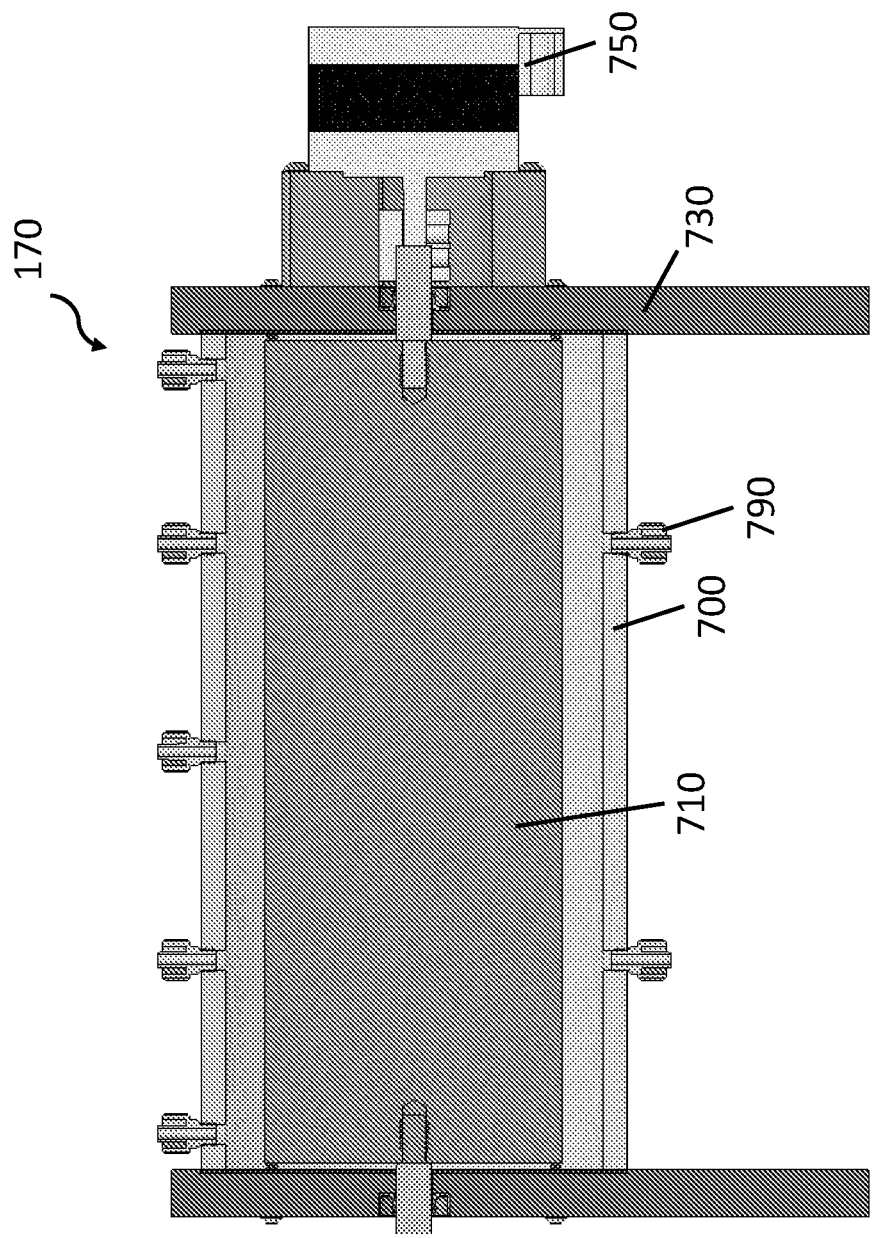

Referring to FIG. 12, an exemplary mixer 170 includes a single solid inner cylinder 710 configured to rotate within a stationary hollow outer cylinder 700. A benefit of a mixer using a single inner cylinder is the simplicity of the design and implementation of the apparatus. The cylinder can be supported on both ends, allowing the mixer to be as large as desired without concern for the moment applied to the motor shaft (not shown) that may be caused by a cantilevered inner cylinder. The apparatus requires only a single motor 750.

Figure 13:
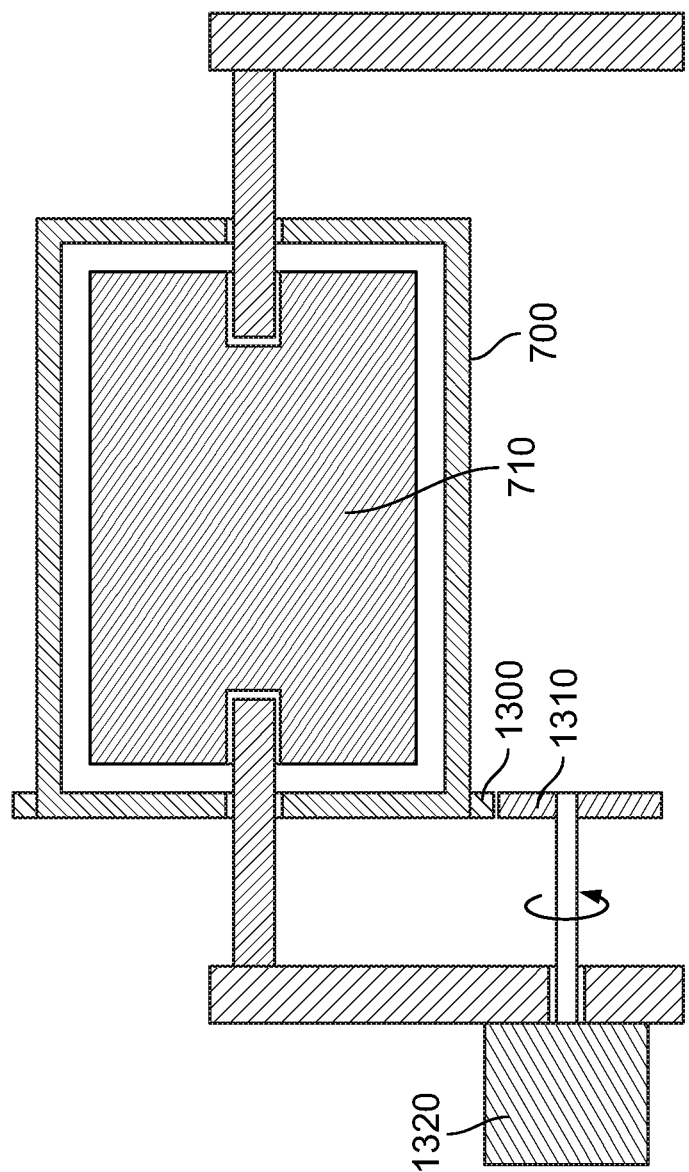
FIG. 13 is a schematic drawing illustrating an exemplary mixer having a hollow outer cylinder configured to rotate relative to a concentric, stationary inner cylinder, in accordance with an embodiment of the invention.

Referring to FIG. 13, an exemplary mixer 170 has a hollow outer cylinder 700 configured to rotate relative to a concentric, stationary inner cylinder 710. For example, the outer cylinder can have gear features 1310 that can mate with motor driven gears 1320 that are connected to a motor 1320, to rotate the outer cylinder relative to the stationary inner cylinder.

Figure 14:
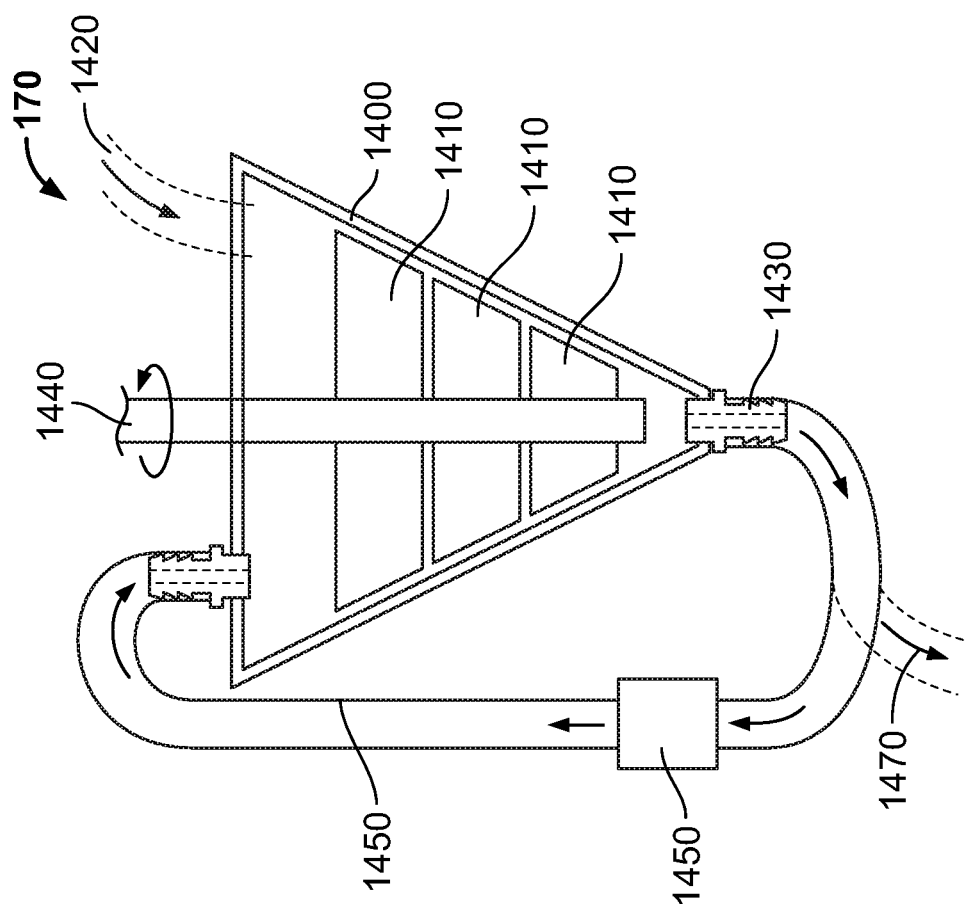
FIG. 14 is a schematic drawing illustrating an exemplary mixer for additive manufacturing, including a stationary outer cone and at least one rotational inner conical body, in accordance with an embodiment of the invention.

Referring to FIG. 14, in an embodiment, a mixer 170 may include a stationary hollow outer cone 1400 and at least one rotational inner conical body 1410. The hollow outer cone confining the contents of the mixer can include least one inlet 1420 and one outlet 1430. The inner conical bodies 1410 can be mounted on a rotating shaft 1440 that shares a center axis with the hollow outer cone 1400. The shaft can be mounted on a motor (not shown) to generate rotation. Like in previous embodiments, material can be fed into one of the mixer inlets from a material container using a pump. The inlet and outlet are in fluidic communication with each other via flexible tubing 1450. A circulation pump 1460 in-line with the tubing can drive circulation from the outlet at the bottom of the mixer to the inlet on the top of the mixer. A benefit of circulating the material through the mixer is to prevent sedimentation of particles in the fluid material from gathering at the bottom of the mixer. Material from the outlet may be transferred via a conduit 1460 to a reservoir 196.

FIG. 15 provides sample calculations for average shear stress based on viscosity, mixer dimensions, and RPM. These calculations allow one to understand the relationship between viscosity, the inner cylinder rotational velocity, and the resultant shear in the fluid. Thereby, when the viscosity of the contents of the mixer changes, perhaps due to a change in temperature, then cylinder rotational velocity can be appropriately adjusted to maintain a critical level of shear in the fluid.

FIGS. 16A and 16B are graphs illustrating average shear stress in the mixer as a function of mixer outer diameter and mixer length, as well as average shear stress in the mixer as a function of length and mixer gap. In order to determine the shear required for thorough mixing, an experimental test mixer can be used with known dimensions and a material of known composition and viscosity. The rotational velocity can be controlled using a microcontroller, and thus the shear in the fluid can be calculated using the equations in FIG. 15. Samples of material can be taken from the test mixer after a specified amount of time and observed under a microscope to qualify the efficacy of the mixing. Aggregations of fiber or inconsistent fiber concentration throughout the sample or between samples indicates ineffective mixing, and thus the shear must be increased for an identical mixing period. Once the required shear has been determined, the equations of FIG. 15, as well as visual design aids such as FIGS. 16A and 16B, can be used to design a mixer of any size for a target shear. In this particular example illustrated in FIGS. 16A and 16B, maximum shear stress transfers to the resin when the gap 720 is less than 0.5 mm, and the mixer 170 outer diameter is less than 5 inches for a 1000 cP viscosity material between 2-12 RPMs. Therefore, based on this example, a suitable mixer may have an outer diameter of 4.5 inches, a length of 1.5 inches, and inner cylinder diameter of 4.48 inches. If the user knows the viscosity of the material being mixed and understands how that viscosity changes with temperature, the user may implement a control system to adjust the inner cylinder rotational velocity to adjust the shear up or down accordingly. The mixer generally relies on Taylor-Couette flow. Above certain velocities, Taylor vortices may be generated, further improving mixing.

The systems described herein, e.g., with respect to FIG. 1, may be used for handling precursors during additive manufacturing. Traditionally, materials for resin-based additive manufacturing are formulated and mixed before packaging. Some material systems experience a limited shelf-life due to the instability of the resin formulation. Some embodiments of the invention include mixing resin formulations in-line with the additive manufacturing system. This allows the user to implement many different precursors on the fly, and change the resin formulation throughout the course of the fabrication of a single part to tune the physical properties of the resin. This capability allows a user to fabricate an article of manufacture including a cured resin (i.e., a matrix) and a plurality of particles disposed in the resin, with a density of the particles or at least one of a mechanical, thermal, electrical, or electromagnetic property of the particles defining a gradient. The described technology allows the production of unique gradients, for example, a gradual transition of resin composition such that properties shift from a stiff to a hard polymer. In addition, a gradient of particles may be employed to change mechanical properties (for example: stiffness, hardness, or strength), thermal properties (thermal conductivity), or electrical properties (electrical conductivity, radio frequency absorption).

Suitable precursors for additive manufacturing processes using the systems described herein include monomers, oligomers, and polymers (such as acrylates, Poly(methyl methacrylate), epoxies, ring opening metathesis polymerization (ROMP) monomers, or polyurethanes), solvents (such as acetone, isopropyl alcohol, ethanol, methanol, or water), particles (suitable examples of particles are: polymeric, metallic, or ceramic fibers, whiskers, and/or platelets, e.g., carbon fiber, alumina oxide, silica nanoparticles, magnetic nanoparticles, and other particles ranging from tens of nanometers to hundreds of microns in length; the particles may be coated with a magnetic coatings and/or a sizing agent in order to functionalize the surface), photoinitiators (e.g., Ivocerin (Bis (4-methoxybenzoyl) diethylgermanium), BAPO (Phenylbis (2,4,6-trimethylbenzoyl) phosphine oxide), and TPO-L (Ethyl (2,4,6-trimethylbenzoyl) phenylphosphinate)), ruthenium based photocatalysts, thermal initiators (e.g., tert-Butyl peroxide, tert-Butyl peroxybenzoate, and 2,2'-Azobisisobutyronitrile (AIBN)), pigments (such as carbon black dispersions), adhesion promotors (e.g., Sartomer CD 9054, dyes (i.e. rhodamine B), and UV-blocking agents (i.e. Mayzo OB+ (2,2'-(2,5-thiophenediyl)bis(5-tert-butylbenzoxazole))), or any combination of the listed precursors. For example, a slurry including a mixture of suitable monomers or oligomers and solid particles may be introduced to the additive manufacturing process using the systems described.

As used herein, a resin is a precursor fluid including, e.g., one or more of monomers, oligomers, polymers, and may include photoinitiators (such as BAPO, and TPO-L), thermal initiators, pigments, adhesion promoters, and/or UV blocking agents.

As used herein, a matrix is a cured resin.

Providing Material to the Mixer

In an exemplary embodiment, precursor materials, e.g., a first and a second precursor such as acrylic oligomers and a dispersion of acrylic monomer and photoinitiator are supplied to the material dock by material containers. The precursors are driven by the premixing pump from the material containers through flow-controlled conduits to the mixer according to an amount and ratio defined by the control system. These parameters are calculated by the control system based on the desired composition and viscosity of the material to be provided to the reservoir by the mixing and dispensing system. For example, in some embodiments, the user desires a material that consists of a certain precursor ratio and volume fraction of particles. If 1 liter of the desired material is to be made with 20% volume fraction of glass fiber, the fluid dispensing pump distributes 800 mL of the liquid precursors to the mixer. After the precursors have been mixed, the particle dispensing system adds approximately 520 grams of fiber (assuming density of 2.6 g/cc). The mixing system then mixes the fibers into the liquid resin for several minutes to several hours before dispensing to the additive manufacturing reservoir.

In some cases, it is advantageous to mix the particles into the fluid precursors at, e.g., 50% volume fraction to form a slurry, and then to dilute the suspension down to the desired volume fraction. This provides the added benefit of enabling higher amounts of shear due to particle-particle interactions as well as a higher viscosity fluid, which leads to better dispersion of the particles.

In some cases, the mixer is connected to a vacuum pump (not shown) in order to draw vacuum (between 5-30 mm Hg) on the mixing enclosure during the mixing process. This allows for bubbles to be drawn out of the resin during the mixing process, which decreases the number of details in the final part.

The flow metering and flow control device limit the amount of fluid transfer. The fluid level sensors may also be used to monitor the amount of precursor material being transported. Once the precursors have reached the mixer, the mixer uses high degrees of shear force to blend the precursors into a well-mixed formulation, e.g., to form a homogeneous dispersion. In some embodiments, the particle dispensing system may add particles to the mixer to be homogeneously dispersed within the fluid.

The mixer is capable of fully mixing fluids and particles on the order of tens of seconds to just a few minutes. The resulting mixture is subsequently transported to a reservoir disposed in vertical alignment with a build plate for additive manufacturing. The mixture is driven by a reservoir pump from the mixer to the reservoir through flow-controlled conduits. Fluid level sensors in the reservoir can be used to prevent an over flow of material from being supplied to the reservoir. The transported mixed material is subsequently cured on the build plate. This process is repeated until the desired part is complete.

Remixing and Transport to the Waste Container

In some embodiments, it may be advantageous to re-mix material within the reservoir. In this case, the reservoir pump or pre-mixing pump may be used to transport material from the reservoir to the mixer, where the mixing process can be repeated. This provides an advantage because suspensions of particles will tend to aggregate and fall out of suspension. However, in certain cases the material in the reservoir or mixer may need to be retired. The reservoir pump may drive material from either the reservoir or the mixer to a waste container through the flow-metering and flow control devices used to monitor the fluid conduits. This provides an advantage because the standard process for removing material from an additive manufacturing reservoir can be manual and tedious.

Cleaning the Reservoir or Mixer

In some embodiments, it may be advantageous to clean the reservoir, flow-controlled conduits, or mixer. One or more of the material containers may be configured with cleaning fluid, i.e., a solvent mixture such as 70:30 isopropyl alcohol and water, which can be driven through the flow-controlled conduits, the mixer, and the reservoir. This can be done multiple times and the material in the system can be driven to the waste container for removal.

Heating

In some embodiments, it may be advantageous to heat the mixer in order to heat the contents of the mixer. This can be done effectively if the body of the mixer is made from a thermally conductive material, such as aluminum. Heating can be achieved using cartridge heaters embedded in the mixer body or silicone sheet heaters wrapped around the outside, and insulation encasing the mixer may reduce heat transfer to the surrounding environment and increase heat transfer into the contents of the mixer. A thermocouple or thermistor, in electrical communication with a microcontroller, can be embedded in the body of the mixer and used as the input to a thermal control loop. One benefit to heating the contents of the mixer is to tune the viscosity of the fluid to benefit pumping the fluid to and from the mixer.

Using Multiple Material Formulations Throughout a Print

A significant advantage of the system in accordance with embodiments of the inventions is being able to alter the material formulation over the course of a single print. In one embodiment, a material formulation that can be dissolved in water may be used to print a base for the rest of the part to print onto. This allows for the part to be removed from the build plate through dissolving the support layer, rather than mechanical detachment. In another embodiment, a part being printed with a formulation that has a low concentration of particles can be programmed with a gradient of increasing particle volume fraction, which creates a gradient in physical properties such as strength and stiffness.

In some cases, the user may control the particle and precursor ratio that is to be mixed in the mixing system and sent to the additive manufacturing reservoir through direct interaction with the controller. A system comprised of various software modules may be used to determine and control the ratio of precursors and solid particles to be used throughout the course of the print, based on user-identified physical properties.

Figure 17:
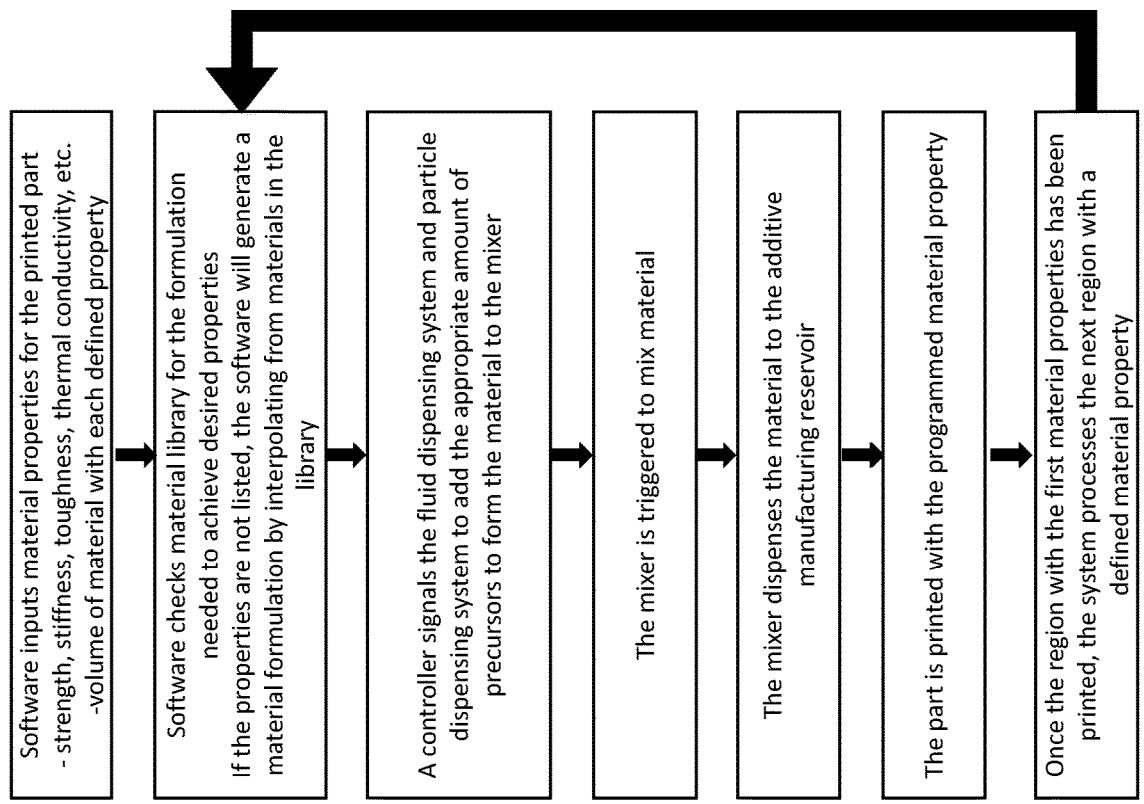
FIG. 17 is a flowchart illustrating an additive manufacturing process controlled by software, in accordance with an embodiment of the invention.

Referring to FIG. 17, in one embodiment, the system may be used to match desired/input material properties with a library of reference formulations (material combinations characterized so that the mechanical, thermal, and electrical properties are known), More specifically, various material properties (e.g., strength, stiffness, toughness, thermal conductivity, electrical conductivity, insular properties, etc.) fir the part to be printed are used as input into the system. In some cases, a materials property library allows users to choose experimentally determined properties. However, if a desired material property is not directly catalogued in the materials library, the formulation may be interpolated using the existing data in the library and a material formulation is generated using the materials in the library. In some instances, a dataset of previously used formulations and material characteristics (including those measures post-manufacture) may be used as a training data set to train a machine learning algorithm to generate a material formulation. Once formulated, a controller signals the fluid dispensing system and particle dispensing system to add the appropriate amount of precursors to form the material to the mixer. The software system them instructs the mixer to mix the material, and to subsequently dispense the material to the additive material reservoir. The part (or region of the part) is then printed with the desired material properties. The process is then repeated for any other regions until the part is completed.

It should be appreciated that the functionality of these components can be implemented on a single computer, or on any larger number of computers in a distributed fashion. The above-described embodiments may be implemented in any of numerous ways. For example, the embodiments may be implemented using hardware, software or a combination thereof. When implemented in software, the software code can be executed on any suitable processor or collection of processors, whether provided in a single computer or distributed among multiple computers. Further, it should be appreciated that a computer may be embodied in any of a number of forms, such as a rack-mounted computer, a desktop computer, a laptop computer, or a tablet computer. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, some embodiments may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. The computer readable medium or media may be non-transitory. The computer readable medium or media can be transportable, such that the program or programs stored thereon can be loaded onto one or more different computers or other processors to implement various aspects of predictive modeling as discussed above. The terms "program" or "software" are used herein in a generic sense to refer to any type of computer code or set of computer-executable instructions that can be employed to program a computer or other processor to implement various aspects described in the present disclosure. Additionally, it should be appreciated that according to one aspect of this disclosure, one or more computer programs that when executed perform predictive modeling methods need not reside on a single computer or processor, but may be distributed in a modular fashion amongst a number of different computers or processors to implement various aspects of predictive modeling.

Fabricated Articles

Articles formed by apparatus/methods described above typically exhibit striations due to the layer-by-layer manufacturing process. Each striation is caused by interfaces between each one cured layer of resin and the next, usually measuring between 5 μm and 150 μm in thickness. Once the resin containing particles is cured, it forms a matrix, with the combination of the matrix and the particles forms a composite.

The equipment and methods described above enable the formation of novel objects. In particular, objects with many layers can be manufactured with a consistent and uniform distribution of particles throughout the entire object. Without the mixing capability described herein, undesirable linear gradients of particle distribution are likely to form due to settling and aggregation effects. For example, if a printed part is 1000 layers tall, typically particles settle in and around the print area, leading to a noticeable gradient that decreases in particle concentration from one layer to subsequent layers of the print while leading to an increase in concentration of particles from the center of a printed layer to the edges of a printed layer.

Embodiments of the invention enable attaining uniformity that exhibits a maximum of ±5% difference in the concentration of particles between two adjacent layers of the article, and e.g., a maximum of ±50% or ±25% or ±10% difference in concentration in particles between the plurality of layers within the article. The desired uniformity may depend on the criticality of the uniformity to the utility of the article. The concentration of particles in a layer may be obtained by averaging the concentrations of ten individual square millimeter areas of the layer. In particular, this concentration may be measured by taking microscopic images of the sectioned surface of the article and counting particles using image recognition software, such as ImageJ. The benefit of maintaining a uniform gradient within the article is to maintain similar, predictable material properties throughout the article.

Referring to FIGS. 18A and 18B, an article 1800 produced by methods disclosed herein includes a matrix 1810 with particles 300, e.g., a single type of particles as discussed above, denoted here as Particle A. Striations 1820 appear on the surface of the article due to layer boundaries. The distribution of the particles 300 from layer to layer, as well as within each layer, is uniform.

Referring to FIGS. 18C and 18D, an article 1800 produced by the methods disclosed herein may include at least two different types of particles 300, 300' e.g., Particle A (e.g., glass particles) and Particle B (e.g., carbon fibers), with the concentration of Particle A being held constant throughout the article, and the concentration of Particle B being independently controlled and varied at a linear rate.

Referring to FIGS. 18E and 18F, an article 1800 produced by the methods disclosed herein may include at least two different types of particles 300, 300' e.g., Particle A and Particle B, with the concentration of Particle A being varied at a linear rate throughout the article, and the concentration of Particle B can be independently controlled and varied at a non-linear rate.

The equipment and methods above enable the formation of articles with controlled, non-linear gradients defined by the concentration of particles throughout the article. For example, the article may begin with a high volume percent of fiber, around 20%. The concentration of fiber may be reduced gradually towards the middle of the print by adding neat resin precursor to the mixer to dilute the volume percent of fiber in the material, and then reverse the process to again increase the volume percent of fiber in the material by gradually adding a fiber precursor to the mixer. The benefit of controlling the concentration of particles throughout an article is to control the mechanical, thermal, electrical, or electromagnetic properties of the article such as yield strength and stiffness, thermal conductivity or thermal tolerance, electrical resistivity and dielectric, or magnetic permeability, respectively.

Analytical Methods

To inspect articles manufactured by the methods disclosed herein, an article can be cross-sectioned and polished followed by inspection via an optical microscope or a scanning electron microscope. The article is preferably cross-sectioned parallel to each layer. This can be done using a saw, sanding apparatus, or mill and lathe. The article may be polished using a polishing wheel and polishing compound. For example, to ensure a smooth surface for imaging, sanding may start with 400 grit sand paper, followed by 600 grit, 1000 grit, 2000 grit, and 6000 grit with 3 micron diamond polishing compound. Once a smooth surface is obtained, imaging can be done to determine particle concentration in each layer.

Subsequent polishing steps can be used to process various layers of the article. In a case where adjacent layers are to be observed and compared, a milling machine such as a Tormach 3 axis mill could be used to remove a controlled thickness of material equal to the thickness of the observed striations on the part to expose the next adjacent layer. Polishing may then be repeated. The particle concentration may then be measured by taking microscopic images of the sectioned surface of the article and counting particles using image recognition software, such as ImageJ.

While the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements; the present invention being limited only by the claims appended hereto and the equivalents thereof.

What is claimed is:

1. An additive manufacturing apparatus comprising:
    a mixer comprising an inlet and an outlet;
    a reservoir in fluidic communication with the mixer such that material from the outlet of the mixer is able to flow into the reservoir and material from the reservoir is able to flow into the mixer;
    a build plate disposed in parallel alignment with the reservoir; and
    a reservoir pump configured to drive material from the outlet of the mixer into the reservoir through a conduit, and
    drive material from the reservoir into the mixer through the conduit.

2. The additive manufacturing apparatus of claim 1, further comprising a fluid dispensing system in fluidic communication with the mixer, the fluid dispensing system comprising at least one container.

3. The additive manufacturing apparatus of claim 2, further comprising at least one pre-mixing pump configured to drive material contained in the at least one container through a pre-mixing conduit into the inlet of the mixer.

4. The additive manufacturing apparatus of claim 1, wherein the mixer comprises at least one of a heater or a fluid level sensor.

5. The additive manufacturing apparatus of claim 4, wherein, when the mixer comprises the fluid level sensor, the fluid level sensor is in electrical communication with a control system.

6. The additive manufacturing apparatus of claim 1, wherein the mixer comprises an active mixer.

7. The additive manufacturing apparatus of claim 1, further comprising:
    a solid particle dispensing system configured to dispense solid particles into the mixer.

8. The additive manufacturing apparatus of claim 7, wherein the solid particle dispensing system comprises at least one of:
    a load cell configured to measure a mass of the solid particles; or
    a hopper configured to receive the solid particles from a particle container, the load cell being configured to measure the mass of the solid particles in the hopper when the solid particle dispensing system comprises both the load cell and the hopper.

9. The additive manufacturing apparatus of claim 8, wherein when the solid particle dispensing system comprises the hopper, the solid particle dispensing system further comprises at least one of:

a solenoid controlled valve configured to start and stop the flow of a measured mass of solid particles from the hopper to the mixer;

a wire mesh disposed in at least one of an inlet of the hopper and an outlet of the particle container, configured to constrict flow of particles into the hopper; or a vibration motor configured to vibrate a particle container holder.

10. The additive manufacturing apparatus of claim 8, wherein when the solid particle dispensing system comprises the load cell, the solid particle dispensing system further comprises:

a particle container configured to dispense solid particles into an opening in the mixer, and the load cell is configured to measure a mass of solid particles being removed from the particle container.

11. An additive manufacturing apparatus comprising:

a mixer;

a slurry dispensing system in fluidic communication with an inlet of the mixer and configured to dispense a pre-mixed formulation of resin and fiber directly into the mixer;

a reservoir in fluidic communication with an outlet of the mixer;

a build plate disposed in parallel alignment with the reservoir;

a reservoir pump configured to drive material from the outlet of the mixer into the reservoir through a conduit, and drive material from the reservoir into the mixer through the conduit.

12. The apparatus of claim 11, wherein the slurry dispensing system comprises at least one of a volumetric flow meter to monitor the volumetric flow rate from the slurry dispensing system into the mixer, an auger-driven dispensing system, a pressure-driven dispensing system, a syringe pump, or a peristaltic pump.

13. The additive manufacturing apparatus of claim 1, wherein material flow from the reservoir into the mixer is pre-mixed.

14. An additive manufacturing apparatus comprising:

a mixer comprising an inlet and an outlet;

a reservoir in fluidic communication with the mixer such that material from the outlet of the mixer is able to flow into the reservoir and material from the reservoir is able to flow into the mixer;

a build plate disposed in parallel alignment with the reservoir; and a reservoir pump configured to drive material from the reservoir in a plurality of directions.

15. The additive manufacturing apparatus of claim 14, wherein the reservoir pump is configured to drive material from the reservoir directly into the mixer through a conduit and to drive material from the outlet of the mixer into the reservoir through the conduit.

16. The additive manufacturing apparatus of claim 14, further comprising:

a solid particle dispensing system configured to dispense solid particles into the mixer.

17. The additive manufacturing apparatus of claim 16, wherein the solid particle dispensing system comprises at least one of:

a load cell configured to measure a mass of the solid particles; or a hopper configured to receive the solid particles from a particle container, the load cell being configured to measure the mass of the solid particles in the hopper when the solid particle dispensing system comprises both the load cell and the hopper.

18. The additive manufacturing apparatus of claim 17, wherein when the solid particle dispensing system comprises the hopper, the solid particle dispensing system further comprises at least one of:

a solenoid controlled valve configured to start and stop the flow of a measured mass of solid particles from the hopper to the mixer;

a wire mesh disposed in at least one of an inlet of the hopper and an outlet of the particle container, configured to constrict flow of particles into the hopper; or a vibration motor configured to vibrate a particle container holder.

19. The additive manufacturing apparatus of claim 17, wherein when the solid particle dispensing system comprises the load cell, the solid particle dispensing system further comprises:

a particle container configured to dispense solid particles into an opening in the mixer, and the load cell is configured to measure a mass of solid particles being removed from the particle container.

\* \* \* \* \*